(12) United States Patent
 Fan

(10) Patent No.: US 11,895,399 B2
(45) Date of Patent: Feb. 6, 2024

(54) PHOTOGRAPHING PROCESSING METHOD AND APPARATUS, TERMINAL DEVICE, AND STORAGE MEDIUM

(71) Applicant: Huawei Technologies Co., Ltd., Shenzhen (CN)

(72) Inventor: Chao Fan, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 32 days.

(21) Appl. No.: 17/704,656

(22) Filed: Mar. 25, 2022

(65) Prior Publication Data

US 2022/0217275 A1 Jul. 7, 2022

Related U.S. Application Data

(63) Continuation of application No. PCT/CN2020/115762, filed on Sep. 17, 2020.

(30) Foreign Application Priority Data

Sep. 27, 2019 (CN) .......................... 201910926242.6

(51) Int. Cl.
 *H04N 23/667* (2023.01)
 *H04N 23/80* (2023.01)
 *H04N 23/63* (2023.01)
 *H04N 5/262* (2006.01)

(52) U.S. Cl.
 CPC ......... *H04N 23/667* (2023.01); *H04N 23/632* (2023.01); *H04N 23/80* (2023.01); *H04N 5/2621* (2013.01)

(58) Field of Classification Search
 CPC ......... H04N 23/63–633; H04N 23/667; H04N 5/2621; H04N 23/80; H04N 23/90; H04N 23/95; H04N 23/951; H04N 23/955; H04N 23/957; H04N 23/958; H04N 23/959
 See application file for complete search history.

(56) References Cited

U.S. PATENT DOCUMENTS

| | | | |
|---|---|---|---|
| 9,836,484 B1 | 12/2017 | Bialynicka-Birula et al. | |
| 2008/0231724 A1 | 9/2008 | Wang | |
| 2014/0204244 A1 | 7/2014 | Choi et al. | |
| 2017/0200314 A1 | 7/2017 | Jeong | |
| 2019/0379832 A1* | 12/2019 | Topalli | H04N 23/64 |
| 2019/0379838 A1* | 12/2019 | Wang | G06T 7/13 |

(Continued)

FOREIGN PATENT DOCUMENTS

| | | | | |
|---|---|---|---|---|
| CN | 102811306 A | * | 12/2012 | ......... H04N 5/23245 |
| CN | 103945113 A | | 7/2014 | |
| CN | 104243822 A | | 12/2014 | |

(Continued)

*Primary Examiner* — Paul M Berardesca
(74) *Attorney, Agent, or Firm* — Conley Rose, P.C.

(57) ABSTRACT

A photographing processing method includes determining whether a multi-mode switch is turned on for a camera of the terminal device when the camera is in an enabled state, where the multi-mode switch is used to control whether the camera uses a plurality of shooting modes to simultaneously photograph, and when the multi-mode switch is turned on for the camera, controlling, according to an externally triggered photographing instruction, the camera to photograph in the plurality of shooting modes.

20 Claims, 11 Drawing Sheets

(56) References Cited

U.S. PATENT DOCUMENTS

2021/0067695 A1* 3/2021 Watanabe ............ H04N 23/667
2022/0217275 A1 7/2022 Fan

FOREIGN PATENT DOCUMENTS

| CN | 105357451 | A | 2/2016 |
| CN | 105760040 | A | 7/2016 |
| CN | 108471498 | A | 8/2018 |
| CN | 108718389 | A | 10/2018 |
| CN | 110769152 | A | 2/2020 |
| EP | 2757773 | A2 | 7/2014 |
| JP | 2000287106 | A | 10/2000 |

* cited by examiner

PHOTOGRAPHING PROCESSING METHOD AND APPARATUS, TERMINAL DEVICE, AND STORAGE MEDIUM

CROSS-REFERENCE TO RELATED APPLICATIONS

This is a continuation of International Patent Application No. PCT/CN2020/115762 filed on Sep. 17, 2020, which claims priority to Chinese Patent Application No. 201910926242.6 filed on Sep. 27, 2019. The disclosures of the aforementioned applications are hereby incorporated by reference in their entireties.

TECHNICAL FIELD

This application relates to the field of terminal technologies, and in particular, to a photographing processing method and apparatus, a terminal device, and a storage medium.

BACKGROUND

With continuous improvement of functions of a terminal device, a photographing function has become an important standard for a user to select the terminal device. Currently, a terminal device may provide a plurality of shooting modes, for example, a monochrome mode, a beautification mode, and an automatic mode. This enriches a scenario in which a user uses a camera, and improves entertainment performance of the terminal device.

In the conventional technology, because a camera function of a terminal device can provide only one shooting mode at a same moment, when a user is dissatisfied with a current shooting mode or wants to view photographing effects of different shooting modes, the user needs to re-operate an application interface to select a new shooting mode. Consequently, an operation process is complicated, time is wasted, and an important photographing moment may be missed, resulting in poor user experience.

SUMMARY

Embodiments of this application provide a photographing processing method and apparatus, a terminal device, and a storage medium, to resolve a problem in an existing photographing mode that an operation process is complex and an important photographing moment may be missed.

According to a first aspect, this application provides a photographing processing method, including: when a camera of a terminal device is in an enabled state, determining whether a multi-mode switch is turned on for the camera, where the multi-mode switch is used to control whether the camera uses a plurality of shooting modes to simultaneously photograph, and when the multi-mode switch is turned on for the camera, controlling, according to an externally triggered photographing instruction, the camera to photograph in the plurality of shooting modes.

In this embodiment, when the camera of the terminal device is used for photographing, a multi-mode function is enabled. In this way, a display interface of the terminal device can simultaneously display photographing pictures of a plurality of modes selected by a user such that the user can more directly observe which photographing picture has a better effect. This reduces an operation of switching mode scenarios back and forth, and also avoids a problem that an important photographing moment may be missed, thereby improving user experience.

In a possible implementation of the first aspect, controlling, according to an externally triggered photographing instruction, the camera to photograph in the plurality of shooting modes includes controlling, according to the externally triggered photographing instruction, the camera to collect a picture of a target photographing scenario, to obtain an original collection resource, copying the original collection resource based on a quantity of shooting modes enabled by the camera, to obtain a plurality of original collection resources whose content is totally consistent, and processing each original collection resource by using an image processing method corresponding to each shooting mode, to obtain a photographing resource corresponding to each shooting mode.

In this embodiment, under an external photographing instruction, the photographing resource corresponding to each shooting mode may be obtained based on the original collection resource. This lays a foundation for subsequently displaying photographing resources corresponding to a plurality of modes on the interface of the terminal device.

Optionally, before controlling, according to an externally triggered photographing instruction, the camera to photograph in the plurality of shooting modes, the method further includes determining the plurality of shooting modes enabled by the camera and the quantity of shooting modes, and dividing, based on the quantity of shooting modes enabled by the camera, the display interface of the terminal device into a plurality of sub-areas whose quantity is consistent with the quantity of shooting modes such that each sub-area presents a photographing preview effect of one shooting mode. In the solution of this embodiment, in a subsequent photographing process, the photographing resources collected by the camera in the plurality of shooting modes may be respectively displayed in corresponding sub-areas. This achieves an objective that the terminal device simultaneously displays multi-mode photographing resources.

In an example, determining the plurality of shooting modes enabled by the camera and the quantity of shooting modes includes determining, based on preset camera information in the terminal device, the plurality of shooting modes enabled by the camera and the quantity of shooting modes.

In another example, determining the plurality of shooting modes enabled by the camera and the quantity of shooting modes includes obtaining a mode selection indication of the user, and determining, based on the mode selection indication, the plurality of shooting modes enabled by the camera and the quantity of shooting modes.

In this embodiment, the plurality of shooting modes enabled by the camera and the quantity of shooting modes may be obtained based on the preset camera information in the terminal device, or may be obtained based on the mode selection indication of the user. A determining manner is flexible and variable, and the user may perform determining based on a requirement such that user experience is good.

In another possible implementation of this application, the method further includes: saving a plurality of photographing resources that are photographed by the camera in the plurality of shooting modes.

In this embodiment, the terminal device may simultaneously save photographing resources (photos and videos) in all selected shooting modes. In this way, the user may select, based on an actual requirement, to-be-reserved or to-bedeleted photographing resources, and may simultaneously save photos and videos in all selected modes or scenarios, thereby avoiding repeated photographing.

In still another possible implementation of this application, the method further includes: when the multi-mode switch is not turned on for the camera, determining that the camera enables an artificial intelligence (AI) shooting mode, where the AI shooting mode includes a plurality of scenario modes, and controlling the camera to photograph based on the plurality of scenario modes included in the AI shooting mode.

In this embodiment, the camera of the terminal device may simultaneously photograph in the plurality of scenario modes, and simultaneously display photographing resources corresponding to all scenario modes on the display interface such that the user can more directly observe which picture has a better effect without an operation of switching modes back and forth. This avoids a problem that an operation process is complex or an important photographing moment may be missed during mode switching.

Optionally, before controlling the camera to photograph based on the plurality of scenario modes included in the AI shooting mode, the method further includes recognizing the target photographing scenario of the camera, to determine a plurality of scenarios in the target photographing scenario, determining, based on the plurality of scenarios in the target photographing scenario and from the plurality of scenario modes included in the AI shooting mode, at least two scenario modes enabled by the camera, and dividing the display interface of the terminal device based on a quantity of scenario modes enabled by the camera, to obtain a plurality of sub-areas whose quantity is consistent with a quantity of the at least two scenario modes, where each sub-area is used to present a photographing preview effect of one scenario mode.

In this embodiment, in a subsequent photographing process, the terminal device may respectively display, in corresponding sub-areas, the photographing resources collected in the plurality of scenario modes. This achieves an objective that the terminal device simultaneously displays the photographing resources in the plurality of scenario modes.

For example, controlling the camera to photograph based on the plurality of scenario modes included in the AI shooting mode includes controlling, according to the externally triggered photographing instruction, the camera to collect the picture of the target photographing scenario, to obtain the original collection resource, copying the original collection resource based on the quantity of scenario modes enabled by the camera, to obtain a plurality of original collection resources whose content is totally consistent, and processing each original collection resource by using an image processing method corresponding to each scenario mode, to obtain and save a photographing resource corresponding to each scenario mode.

In this embodiment, after obtaining the photographing resource corresponding to each scenario mode, the terminal device may save the photographing resources corresponding to all scenario modes into the terminal device such that the user subsequently processes the saved photographing resources in the plurality of scenario modes based on an actual requirement, thereby avoiding repeated photographing.

In yet another possible implementation of this application, the method further includes: when the multi-mode switch is not turned on for the camera, determining that the camera enables a augmented reality (AR) shooting mode, where the AR shooting mode includes a plurality of special effects, and controlling the camera to select different special effects for photographing in the AR shooting mode.

In this embodiment, during photographing, the terminal device may simultaneously photograph pictures or videos with a plurality of AR special effects such that the user can more directly observe which AR special effect has a better effect. This reduces an operation of switching mode scenarios back and forth, and avoids repeated photographing, thereby improving user experience.

Optionally, before controlling the camera to select different special effects for photographing in the AR shooting mode, the method further includes obtaining a special effect selection indication of the user, where the special effect selection indication is used to indicate an AR special effect superimposed on the target photographing scenario, determining, based on the special effect selection indication, that the camera uses at least two AR special effects, and dividing the display interface of the terminal device based on a quantity of AR special effects used by the camera, to obtain a plurality of sub-areas whose quantity is consistent with a quantity of the at least two AR special effects, where each sub-area is used to present a photographing preview effect obtained after the AR special effect is superimposed.

In this embodiment, in a subsequent photographing process, the terminal device may respectively display, in corresponding sub-areas, photographing resources on which the AR special effects are superimposed. This achieves an objective that the terminal device simultaneously displays the photographing resources on which the AR special effects are superimposed.

For example, controlling the camera to select different special effects for photographing in the AR shooting mode includes controlling, according to the externally triggered photographing instruction, the camera to collect the picture of the target photographing scenario, to obtain the original collection resource, copying the original collection resource based on the quantity of AR special effects used by the camera, to obtain a plurality of original collection resources whose content is totally consistent, and superimposing each AR special effect on a corresponding original collection resource, to obtain and save a photographing resource on which each AR special effect is superimposed.

In this embodiment, after obtaining each photographing resource on which the AR special effect is superimposed, the terminal device may save each photographing resource into the terminal device such that the user subsequently processes, based on an actual requirement, the saved photographing resource on which the AR special effect is superimposed, thereby avoiding repeated photographing.

According to a second aspect, this application provides a photographing processing apparatus, including a processing module and a control module.

The processing module is configured to: when a camera of a terminal device is in an enabled state, determine whether a multi-mode switch is turned on for the camera. The multi-mode switch is used to control whether the camera uses a plurality of shooting modes to simultaneously photograph.

The control module is configured to: when the multi-mode switch is turned on for the camera, control, according to an externally triggered photographing instruction, the camera to photograph in the plurality of shooting modes.

In a possible implementation of the second aspect, the control module is configured to: when the multi-mode switch is turned on for the camera, control, according to the externally triggered photographing instruction, the camera to collect a picture of a target photographing scenario, to obtain an original collection resource, copy the original collection resource based on a quantity of shooting modes enabled by the camera, to obtain a plurality of original collection resources whose content is totally consistent, and process each original collection resource by using an image processing apparatus corresponding to each shooting mode, to obtain a photographing resource corresponding to each shooting mode.

Optionally, the processing module is further configured to: before the control module controls, according to the externally triggered photographing instruction, the camera to photograph in the plurality of shooting modes, determine the plurality of shooting modes enabled by the camera and the quantity of shooting modes, and divide, based on the quantity of shooting modes enabled by the camera, a display interface of the terminal device into a plurality of sub-areas whose quantity is consistent with the quantity of shooting modes such that each sub-area presents a photographing preview effect of one shooting mode.

In an example, that the processing module is configured to determine the plurality of shooting modes enabled by the camera and the quantity of shooting modes is as follows:

The processing module is configured to determine, based on preset camera information in the terminal device, the plurality of shooting modes enabled by the camera and the quantity of shooting modes.

In another example, that the processing module is configured to determine the plurality of shooting modes enabled by the camera and the quantity of shooting modes is as follows:

The processing module is configured to obtain a mode selection indication of a user, and determine, based on the mode selection indication, the plurality of shooting modes enabled by the camera and the quantity of shooting modes.

In another possible implementation of the second aspect, the processing module is further configured to save a plurality of photographing resources that are photographed by the camera in the plurality of shooting modes.

In still another possible implementation of the second aspect, the processing module is further configured to: when the multi-mode switch is not turned on for the camera, determine that the camera enables an AI shooting mode. The AI shooting mode includes a plurality of scenario modes.

The control module is further configured to control the camera to photograph based on the plurality of scenario modes included in the AI shooting mode.

Optionally, the processing module is further configured to: before the control module controls the camera to photograph based on the plurality of scenario modes included in the AI shooting mode, recognize the target photographing scenario of the camera, to determine a plurality of scenarios in the target photographing scenario, determine, based on the plurality of scenarios in the target photographing scenario and from the plurality of scenario modes included in the AI shooting mode, at least two scenario modes enabled by the camera, and divide the display interface of the terminal device based on a quantity of scenario modes enabled by the camera, to obtain a plurality of sub-areas whose quantity is consistent with a quantity of the at least two scenario modes, where each sub-area is used to present a photographing preview effect of one scenario mode.

For example, the control module is further configured to control, according to the externally triggered photographing instruction, the camera to collect the picture of the target photographing scenario, to obtain the original collection resource, copy the original collection resource based on the quantity of scenario modes enabled by the camera, to obtain a plurality of original collection resources whose content is totally consistent, and process each original collection resource using an image processing apparatus corresponding to each scenario mode, to obtain and save a photographing resource corresponding to each scenario mode.

In still another possible implementation of the second aspect, the processing module is further configured to: when the multi-mode switch is not turned on for the camera, determine that the camera enables a AR shooting mode. The AR shooting mode includes a plurality of special effects.

The control module is further configured to control the camera to select different special effects for photographing in the AR shooting mode.

Optionally, the processing module is further configured to: before the control module controls the camera to select different special effects for photographing in the AR shooting mode, obtain a special effect selection indication of the user, where the special effect selection indication is used to indicate an AR special effect superimposed on the target photographing scenario, determine, based on the special effect selection indication, that the camera uses at least two AR special effects, and divide the display interface of the terminal device based on a quantity of AR special effects used by the camera, to obtain a plurality of sub-areas whose quantity is consistent with a quantity of the at least two AR special effects, where each sub-area is used to present a photographing preview effect obtained after the AR special effect is superimposed.

For example, the control module is further configured to control, according to the externally triggered photographing instruction, the camera to collect the picture of the target photographing scenario, to obtain the original collection resource, copy the original collection resource based on the quantity of AR special effects used by the camera, to obtain a plurality of original collection resources whose content is totally consistent, and superimpose each AR special effect on a corresponding original collection resource, to obtain and save a photographing resource on which each AR special effect is superimposed.

For beneficial effects of the possible designs of the second aspect, refer to records in the possible designs of the first aspect. Details are not described herein again.

According to a third aspect, an embodiment of this application provides a terminal device. The terminal device includes a processor and a memory. The memory is configured to store a program, and the processor invokes the program stored in the memory to perform the method provided in the first aspect of this application.

According to a fourth aspect, an embodiment of this application provides a chip, and the chip is configured to perform the method in the first aspect.

According to a fifth aspect, an embodiment of this application provides a computer-readable storage medium. The computer-readable storage medium stores instructions, and when the instructions are run on a computer, the computer is enabled to perform the method in the first aspect.

According to a sixth aspect, an embodiment of this application provides a computer program product including instructions. When the computer program product runs on a computer, the computer is enabled to perform the method in the first aspect.

Embodiments of this application provide a photographing processing method and apparatus, a terminal device, and a storage medium. The method includes: when a camera of a terminal device is in an enabled state, determining whether a multi-mode switch is turned on for the camera, where the multi-mode switch is used to control whether the camera uses a plurality of shooting modes to simultaneously photograph, and when the multi-mode switch is turned on for the camera, controlling, according to an externally triggered photographing instruction, the camera to photograph in the plurality of shooting modes. In this technical solution, because the camera of the terminal device has the multi-mode switch, a user may turn on the multi-mode switch when performing photographing. In this way, the terminal device may perform photographing in a plurality of modes at the same time, display effects in all modes on an interface at the same time, and complete photographing of pictures in the plurality of modes at the same time. This simplifies an operation process, saves time, and avoids a problem that an important photographing moment may be missed, thereby improving user experience.

DESCRIPTION OF EMBODIMENTS

A photographing processing method provided in embodiments of this application may be applied to an electronic device having a photographing function, for example, a mobile phone, a tablet computer, a laptop computer, an ultra-mobile personal computer (UMPC), a handheld computer, a netbook, a personal digital assistant (PDA), a wearable device, or a augmented reality device. This is not limited in embodiments of this application.

Figure 1:
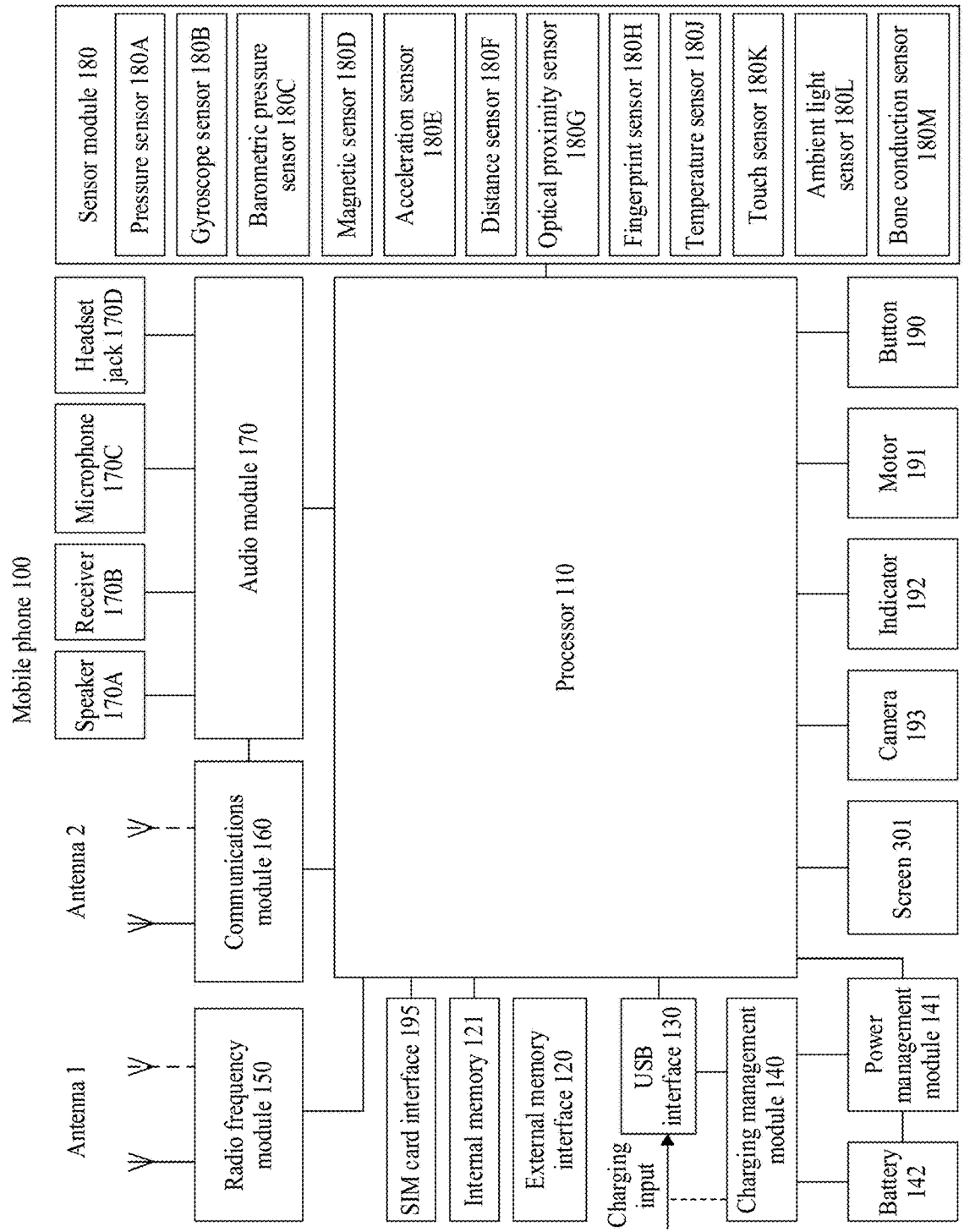
FIG. 1 is a schematic diagram of a structure of a mobile phone.

For example, a mobile phone 100 is the electronic device. FIG. 1 is a schematic diagram of a structure of the mobile phone.

The mobile phone 100 may include a processor 110, an external memory interface 120, an internal memory 121, a universal serial bus (USB) interface 130, a charging management module 140, a power management module 141, a battery 142, an antenna 1, an antenna 2, a radio frequency module 150, a communications module 160, an audio module 170, a speaker 170A, a receiver 170B, a microphone 170C, a headset jack 170D, a sensor module 180, a button 190, a motor 191, an indicator 192, a camera 193, a screen 301, a subscriber identification module (SIM) card interface 195, and the like.

It may be understood that the structure shown in this embodiment of this application does not constitute a specific limitation on the mobile phone 100. In some other embodiments of this application, the mobile phone 100 may include more or fewer components than those shown in the figure, or combine some components, or split some components, or have different component arrangements. The components shown in the figure may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent devices, or may be integrated into one or more processors.

The controller may be a nerve center and a command center of the mobile phone 100. The controller may generate an operation control signal based on an instruction operation code and a time sequence signal, to control instruction reading and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access and reduces waiting time of the processor 110, thereby improving system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a USB interface, and/or the like.

The I2C interface is a two-way synchronous serial bus, including a serial data line (SDA) and a serial clock line (SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface such that the processor 110 communicates with the touch sensor 180K through the I2C bus interface, to implement a touch function of the mobile phone 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the communications module 160 through the I2S interface, to implement a function of answering a call by using a BLUETOOTH (BT) headset.

The PCM interface may also be configured to perform audio communication, and sample, quantize, and code an analog signal. In some embodiments, the audio module 170 may be coupled to the communications module 160 through a PCM bus interface. In some embodiments, the audio module 170 may also transmit an audio signal to the communications module 160 through the PCM interface, to implement a function of answering a call by using a BT headset. Both the I2S interface and the PCM interface may be configured to perform audio communication.

The UART interface is a universal serial data bus, and is configured to perform asynchronous communication. The bus may be a two-way communications bus. The bus switches to-be-transmitted data between serial communication and parallel communication. In some embodiments, the UART interface is usually configured to connect the processor 110 and the communications module 160. For example, the processor 110 communicates with a BT module in the communications module 160 through the UART interface, to implement a BT function. In some embodiments, the audio module 170 may transmit an audio signal to the communications module 160 through the UART interface, to implement a function of playing music using a BT headset.

The MIPI interface may be configured to connect the processor 110 to a peripheral component such as a flexible display 301 or the camera 193. The MIPI interface includes a camera serial interface (CSI), a display serial interface (DSI), and the like. In some embodiments, the processor 110 communicates with the camera 193 through the CSI interface, to implement a photographing function of the mobile phone 100. The processor 110 communicates with the flexible display 301 through the DSI to implement a display function of the mobile phone 100.

The GPIO interface may be configured by using software. The GPIO interface may be configured as a control signal or a data signal. In some embodiments, the GPIO interface may be configured to connect the processor 110 and the camera 193, the screen 301, the communications module 160, the audio module 170, the sensor module 180, or the like. The GPIO interface may alternatively be configured as the I2C interface, the I2S interface, the UART interface, the MIPI interface, or the like.

The USB interface 130 is an interface that conforms to a USB standard specification, and may be a mini USB interface, a micro USB interface, a USB Type C interface, or the like. The USB interface 130 may be configured to connect to the charger to charge the mobile phone 100, or may be configured to transmit data between the mobile phone 100 and a peripheral device, or may be configured to connect to a headset, to play audio through the headset. This interface may be further configured to connect to another electronic device such as an AR device.

It may be understood that an interface connection relationship between the modules shown in this embodiment of this application is merely an example for description, and does not constitute a limitation on the structure of the mobile phone 100. In some other embodiments of this application, the mobile phone 100 may alternatively use an interface connection manner different from that in the foregoing embodiment, or use a combination of a plurality of interface connection manners.

The charging management module 140 is configured to receive a charging input from the charger. The charger may be a wireless charger or a wired charger. In some embodiments of wired charging, the charging management module 140 may receive a charging input from the wired charger through the USB interface 130. In some embodiments of wireless charging, the charging management module 140 may receive a wireless charging input by using a wireless charging coil of the mobile phone 100. The charging management module 140 may further supply power to the electronic device through the power management module 141 when charging the battery 142.

The power management module 141 is configured to connect to the battery 142, the charging management module 140, and the processor 110. The power management module 141 receives an input from the battery 142 and/or the charging management module 140, and supplies power to the processor 110, the internal memory 121, an external memory, the flexible display 301, the camera 193, the communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the mobile phone 100 may be implemented by using the antenna 1, the antenna 2, the radio frequency module 150, the communications module 160, the modem processor, the baseband processor, and the like.

The antenna 1 and the antenna 2 are configured to transmit and receive electromagnetic wave signals. Each antenna in the mobile phone 100 may be configured to cover one or more communication bands. Different antennas may be multiplexed to improve antenna utilization. For example, the antenna 1 may be multiplexed as a diversity antenna in a wireless local area network. In some other embodiments, the antenna may be used in combination with a tuning switch.

The radio frequency module 150 may provide a wireless communication solution that is applied to the mobile phone 100 and that includes second generation (2G)/third generation (3G)/fourth generation (4G)/fifth generation (5G). The radio frequency module 150 may include at least one filter, a switch, a power amplifier, a low-noise amplifier (LNA), and the like. The radio frequency module 150 may receive an electromagnetic wave through the antenna 1, perform processing such as filtering or amplification on the received electromagnetic wave, and transfer the electromagnetic wave to the modem processor for demodulation. The radio frequency module 150 may further amplify a signal modulated by the modem processor, and convert the signal into an electromagnetic wave for radiation through the antenna 1. In some embodiments, at least some function modules in the radio frequency module 150 may be disposed in the processor 110. In some embodiments, at least some function modules in the radio frequency module 150 may be disposed in a same device as at least some modules in the processor 110.

The modem processor may include a modulator and a demodulator. The modulator is configured to modulate a to-be-sent low-frequency baseband signal into a mediumhigh frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transmits a processed signal to the application processor. The application processor outputs a sound signal through an audio device (which is not limited to the speaker 170A, the receiver 170B, or the like), or displays an image or a video through the flexible display 301. In some embodiments, the modem processor may be an independent component. In some other embodiments, the modem processor may be independent of the processor 110, and is disposed in a same device as the radio frequency module 150 or another function module.

The communications module 160 may provide a wireless communication solution that is applied to the mobile phone 100 and that includes a wireless local area network (WLAN) (for example, a Wi-Fi network), BT, a global navigation satellite system (GNSS), frequency modulation (FM), a near field communication (NFC) technology, an infrared (IR) technology, or the like. The communications module 160 may be one or more devices integrating at least one communications processor module. The communications module 160 receives an electromagnetic wave through the antenna 2, performs frequency modulation and filtering processing on an electromagnetic wave signal, and sends a processed signal to the processor 110. The communications module 160 may further receive a to-be-sent signal from the processor 110, perform frequency modulation and amplification on the signal, and convert the signal into an electromagnetic wave for radiation through the antenna 2.

In some embodiments, the antenna 1 and the radio frequency module 150 of the mobile phone 100 are coupled, and the antenna 2 and the communications module 160 of the mobile phone 100 are coupled such that the mobile phone 100 can communicate with a network and another device by using a wireless communications technology. The wireless communications technology may include Global System for Mobile Communications (GSM), a general packet radio service (GPRS), code-division multiple access (CDMA), wideband CDMA (WCDMA), time-division CDMA (TD-CDMA), Long-Term Evolution (LTE), BT, a GNSS, a WLAN, NFC, FM, an IR technology, and/or the like. The GNSS may include a Global Positioning System (GPS), a global navigation satellite system (GLONASS), a BeiDou navigation satellite system (BDS), a quasi-zenith satellite system (QZSS), and/or a satellite based augmentation system (SBAS).

The following first briefly describes a scenario to which embodiments of this application are applicable.

In the conventional technology, a photographing function of a terminal device has become an important standard for a user to select the terminal device, and increasing photographing modes enrich scenarios in which the user uses a camera. Currently, because the terminal device has only a single image shooting interface, and a camera function of the terminal device can provide only one shooting mode at a same moment, the user has to reselect another shooting mode if the user wants to use another shooting mode. Consequently, the user needs to repeatedly select a shooting mode and a shooting action during photographing, and an operation process is complex and time-consuming. In view of this, in the conventional technology, two cameras of the terminal device may be used for simultaneous photographing. One camera is used for photographing a portrait, and the other camera is used for photographing a scenery. Alternatively, one camera of the terminal device is used to continuously take photos with different parameters, for example, three photos with different depths of field or three photos with different exposure parameters. However, because the terminal device cannot provide a plurality of modes or scenarios at the same time, if the user wants to compare different shooting effects and obtain shooting files in different modes or scenarios, the user has to select different shooting modes for a plurality of times, resulting in complex operations and a waste of time.

To resolve the foregoing technical problem, embodiments of this application provide a photographing processing method. The method includes: when a camera of a terminal device is in an enabled state, determining whether a multi-mode switch is turned on for the camera, where the multi-mode switch is used to control whether the camera uses a plurality of shooting modes to simultaneously photograph, and when the multi-mode switch is turned on for the camera, controlling, according to an externally triggered photographing instruction, the camera to photograph in the plurality of shooting modes. In this technical solution, because the camera of the terminal device has the multi-mode switch, a user may turn on the multi-mode switch when performing photographing. In this way, the terminal device may perform photographing in a plurality of modes at the same time, display effects in all modes on an interface at the same time, and complete photographing of pictures in the plurality of modes at the same time. This simplifies an operation process, saves time, and avoids a problem that an important photographing moment may be missed, thereby improving user experience.

It may be understood that embodiments of this application may be executed by a terminal device, for example, a terminal device having a display interface and a photographing function, such as a mobile phone, a tablet computer, or a professional camera. A representation form of the terminal device may be determined based on an actual situation, and details are not described herein again.

Figure 2:
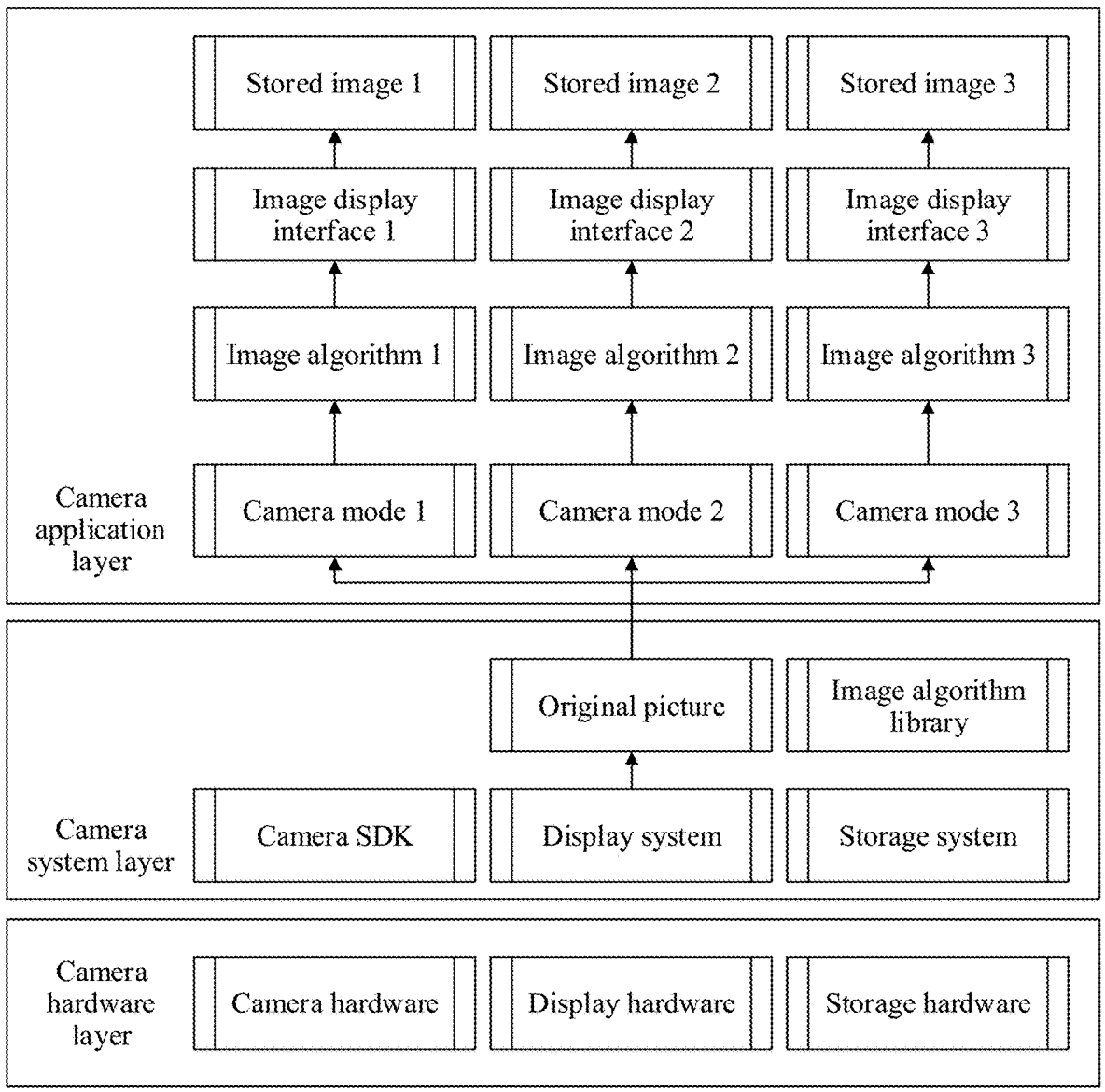
FIG. 2 is a system architectural diagram of a camera in a terminal device.

Before technical solutions of this application are described, a system architectural diagram of a camera in a terminal device in this application is first described as an example. FIG. 2 is a system architectural diagram of a camera in a terminal device. As shown in FIG. 2, a system architecture of a camera mainly includes a camera hardware layer, a camera system layer, and a camera application layer.

Refer to FIG. 2. The camera hardware layer mainly includes camera hardware, display hardware, and storage hardware. For example, the camera hardware may include different types of hardware such as a photosensitive component, a display, and a storage medium. A representation form of each piece of hardware included in the camera hardware layer is not limited in this embodiment, and may be determined according to an actual setting.

The camera system layer may include a camera software development kit (SDK), a display system, an image algorithm library, a storage system, and the like. When the terminal device performs photographing, the display system may output, under actions of the camera SDK, the image algorithm library, and the storage system, an original picture collected by the camera.

The image algorithm library at the camera system layer may simultaneously implement image processing processes in all modes or scenarios, and display a processed image effect on an application layer window.

In this embodiment, the camera application layer may provide a multi-mode or multi-scenario switch. When a multi-mode or multi-scenario shooting is selected, image processing algorithms corresponding to different modes or scenarios are used to separately process original images. The camera application layer may provide a multi-mode or multi-scenario display window. Each window displays a display effect in a different mode or scenario, and after shooting is completed, stores a file obtained after algorithm processing is performed on each mode or scenario.

For example, in the camera application layer in this embodiment, an original picture may be copied into a plurality of copies, and then different images are separately output after processing corresponding to different camera modes is performed. For example, when the original picture passes through a camera mode 1, a stored image 1 is obtained after an image algorithm 1 and an image display interface 1 are successively passed through; when the original picture passes through a camera mode 2, a stored image 2 is obtained after an image algorithm 2 and an image display interface 2 are successively passed through; or when the original picture passes through a camera mode 3, a stored image 3 is obtained after an image algorithm 3 and an image display interface 3 are successively passed through.

It should be noted that a mode included in the camera is not limited in this embodiment of this application, and may be determined based on an actual situation.

The following describes the technical solutions of this application in detail with reference to specific embodiments. It should be noted that the following several specific embodiments may be combined with each other, and a same or similar concept or process may not be described repeatedly in some embodiments.

Figure 3:
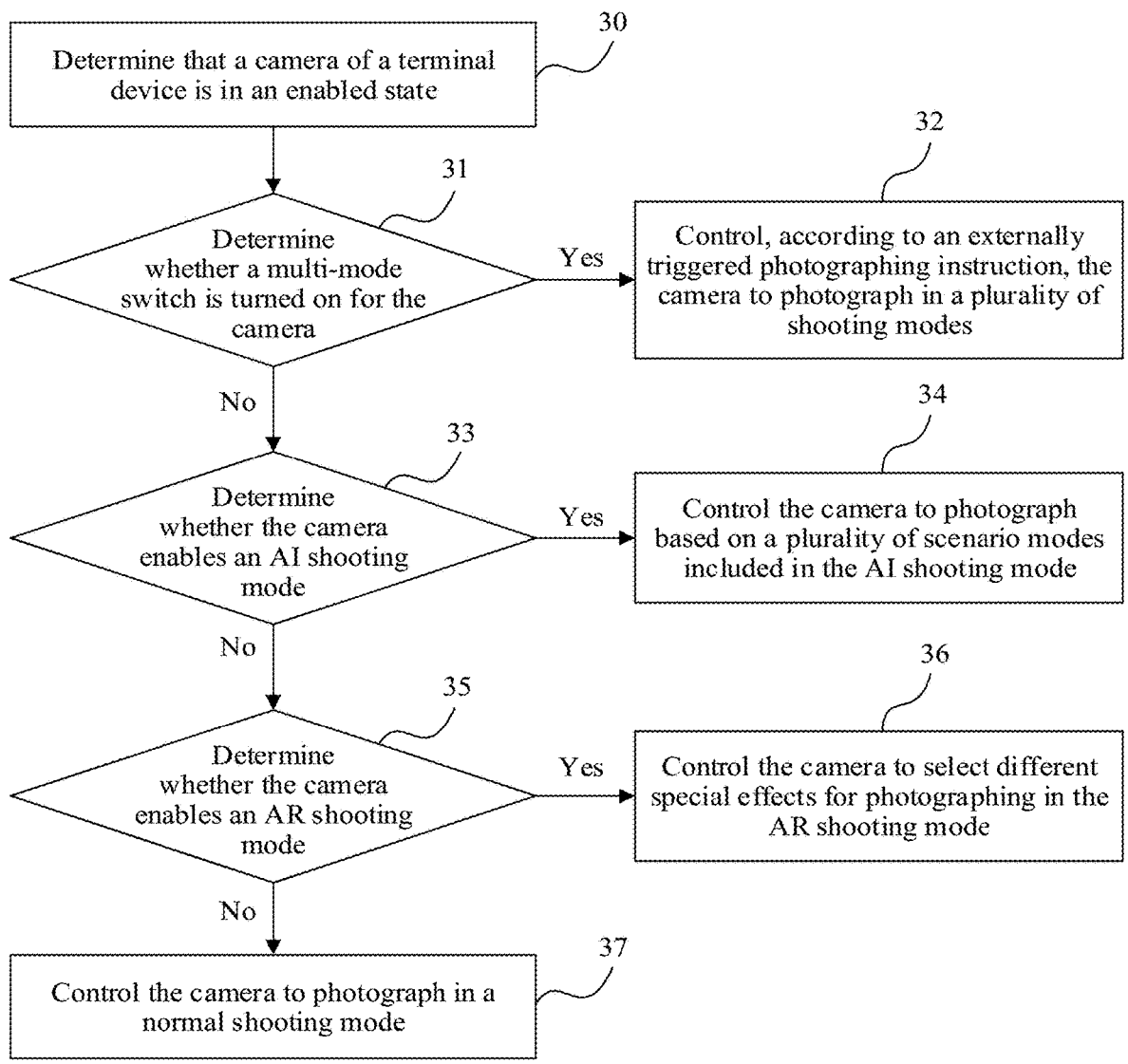
FIG. 3 is a schematic flowchart of Embodiment 1 of a photographing processing method according to this application.

FIG. 3 is a schematic flowchart of Embodiment 1 of a photographing processing method according to this application. As shown in FIG. 3, in this embodiment, the photographing processing method may include the following steps:

Step 30: Determine that a camera of a terminal device is in an enabled state.

Step 31: Determine whether a multi-mode switch is turned on for the camera, and if yes, perform step 32, or if not, perform step 33.

The multi-mode switch is used to control whether the camera uses a plurality of shooting modes to simultaneously photograph.

In this embodiment, the terminal device may receive a camera enabling instruction of a user, and start the camera according to the camera enabling instruction. In an example, the camera enabling instruction may be sent by the user using a camera option in a menu of the terminal device. For example, the camera option may be an icon displayed on a desktop, or may be a shortcut button, or may be a button on the terminal device. In another example, the camera enabling instruction may alternatively be sent by the user by operating a camera application on the terminal device. In still another example, the camera enabling instruction may alternatively be a voice instruction sent by the user. After receiving the voice instruction, the terminal device may also enable a camera function of the terminal device. A manner of sending the camera enabling instruction is not limited in this embodiment, and may be determined based on an actual situation.

For example, when determining that the camera is in the enabled state, the terminal device first determines a manner in which the terminal device may perform photographing, and then performs photographing according to a mode that may be provided.

Optionally, in this embodiment, a mode priority of the camera may be preset in the terminal device. For a terminal device whose camera has multi-mode shooting, AI mode shooting, VR mode shooting, and normal mode shooting, a mode priority sequence may be as follows: a priority of multi-mode shooting is higher than a priority of AI mode shooting, the priority of AI mode shooting is higher than a priority of VR mode shooting, the priority of VR mode shooting is higher than a priority of normal mode shooting, and the like. Therefore, in this embodiment, when determining that the camera is in the enabled state, the terminal device first determines whether the multi-mode switch of the camera is enabled, and then determines a selected shooting mode based on a determining result.

Step 32: Control, according to an externally triggered photographing instruction, the camera to photograph in the plurality of shooting modes.

For example, when the multi-mode switch of the camera in the terminal device is turned on, if the user needs to photograph, after obtained the externally triggered photographing instruction, the camera may be controlled to photograph in the plurality of shooting modes.

Further, when the user shoots a picture or a video of a scenery or a person, if the multi-mode switch of the camera is turned on, the terminal device may select a plurality of shooting modes from all shooting modes supported by the camera such as to control the camera to simultaneously photograph in the plurality of shooting modes.

In this embodiment, the terminal device collects an original picture of a target scenario by using a camera lens and an image sensor of the camera, and then separately processes the collected original picture by using image processing algorithms of the plurality of selected shooting modes to obtain photographed pictures corresponding to different shooting modes, and finally displays the photographed pictures corresponding to the plurality of selected shooting modes on a display interface of the terminal device.

For example, in this embodiment, the shooting modes supported by the camera of the terminal device may include a plurality of different shooting modes such as a normal camera mode, a monochrome mode, a painter mode, a beautification mode, and an automatic mode. It should be noted that, in this embodiment, the shooting mode supported by the camera of the terminal device is not limited, a specific combination form of the plurality of shooting modes selected by the terminal device is not limited either, and both may be determined based on an actual requirement. Details are not described herein again.

Step 33: Determine whether the camera enables an AI shooting mode, and if yes, perform step 34, or if not, perform step 35.

In another example, when the multi-mode switch is not turned on for the camera of the terminal device, to improve user experience, it is determined whether the AI shooting mode of the camera is enabled, and the shooting mode of the camera is determined based on a determining result.

It should be noted that, in this embodiment, a function of the AI shooting mode is simply to analyze an object in a viewfinder frame, and recommend a plurality of scenario modes based on a feature of the object. Each scenario mode may be automatically adjusted based on factors such as a viewing angle and color. In the AI shooting mode, the camera enters the light, performs artificial intelligence analysis and calculation on a light scenario of a photographed object, and automatically matches a shooting mode.

For example, a plurality of scenario modes included in the AI shooting mode may include, for example, a portrait scenario, a food scenario, a pet scenario, a scenery scenario, a city scenario, a flower scenario, a sunrise scenario, and a sunset scenario. The plurality of shooting modes included in the AI shooting mode are not limited in this embodiment, and may be determined based on performance of the terminal device, performance of the camera, and the like. Details are not described herein again.

Step 34: Control the camera to photograph based on the plurality of scenario modes included in the AI shooting mode.

For example, in this embodiment, when the terminal device determines that the camera enables the AI shooting mode, because the AI shooting mode includes the plurality of scenario modes, the terminal device may control the camera to simultaneously photograph by using the plurality of scenario modes included in the AI shooting mode.

Further, the terminal device collects the original picture of the target scenario by using the camera lens and the image sensor of the camera, and then separately performs artificial intelligence analysis and calculation on the light scenario of the photographed object based on the plurality of scenario modes selected in the AI mode, to determine a photographed picture corresponding to each scenario mode and display the photographed picture on the display interface of the terminal device.

Step 35: Determine whether the camera enables an AR shooting mode, and if yes, perform step 36, or if not, perform step 37.

In this embodiment, in still another example, when the multi-mode switch is not turned on for the camera of the terminal device, to improve a visual effect of the camera, it may be determined whether the AR shooting mode of the camera is enabled, and the shooting mode of the camera is determined based on a determining result.

It should be noted that, in this embodiment, AR is also referred to as mixed reality. The augmented reality uses a computer technology to apply virtual information to the real world. The real environment and virtual objects are overlaid in the same picture or space in real time. When the terminal device performs photographing by using the AR technology, an image captured by the camera may have added special effect information.

For example, the special effect information included in the AR shooting mode may include special effect information of different effects such as a sticker, a filter, whitening, and changing. The special effect information included in the AR shooting mode is not limited in this embodiment, and may be determined based on the performance of the terminal device, the performance of the camera, and the like. Details are not described herein again.

Step 36: Control the camera to select different special effects for photographing in the AR shooting mode.

In this embodiment, when the multi-mode switch is not turned on for the camera, but the AR shooting mode is enabled, because the AR shooting mode may include a plurality of special effects, the terminal device may control the camera to photograph in combination with the plurality of special effects and a normal shooting mode.

Further, when the terminal device performs photographing by using a selected shooting mode, the AR shooting mode may be enabled at the same time. In this way, when the camera of the terminal device captures an image, a selected special effect may be further integrated into the captured original picture such that a photographed image displayed on the display interface of the terminal device is an image integrated with the special effect.

Step 37: Control the camera to photograph in the normal shooting mode.

In this embodiment, when the multi-mode switch is not turned on for the camera, the AI shooting mode is not enabled, and the AR shooting mode is not enabled, the terminal device controls the camera to photograph in the normal shooting mode. In other words, the camera may photograph based on a shooting mode selected by the user. The shooting mode may be any one of the shooting modes supported by the camera of the terminal device, such as the automatic mode, a night mode, a whitening mode, and the painter mode.

The photographing processing method provided in this embodiment of this application includes: when the camera of the terminal device is in the enabled state, determining whether the multi-mode switch is turned on for the camera, when the multi-mode switch is turned on for the camera, controlling, according to the externally triggered photographing instruction, the camera to photograph in the plurality of shooting modes, when the multi-mode switch is not turned on for the camera, but the camera enables the AI shooting mode, controlling the camera to photograph based on the plurality of scenario modes included in the AI shooting mode, and when the multi-mode switch is not turned on for the camera, but the camera enables the AR shooting mode, controlling the camera to select different special effects to photograph in the AR shooting mode. In this technical solution, when the camera of the terminal device is used for photographing, a multi-mode function, a multi-scenario function, or a special effect mode is enabled. In this way, the display interface of the terminal device can simultaneously display photographing pictures of a plurality of modes or a plurality of scenarios selected by the user such that the user can more directly observe which photographing picture has a better effect. This reduces an operation of switching mode scenarios back and forth, and also avoids a problem that an important photographing moment may be missed, thereby improving user experience.

Figure 4:
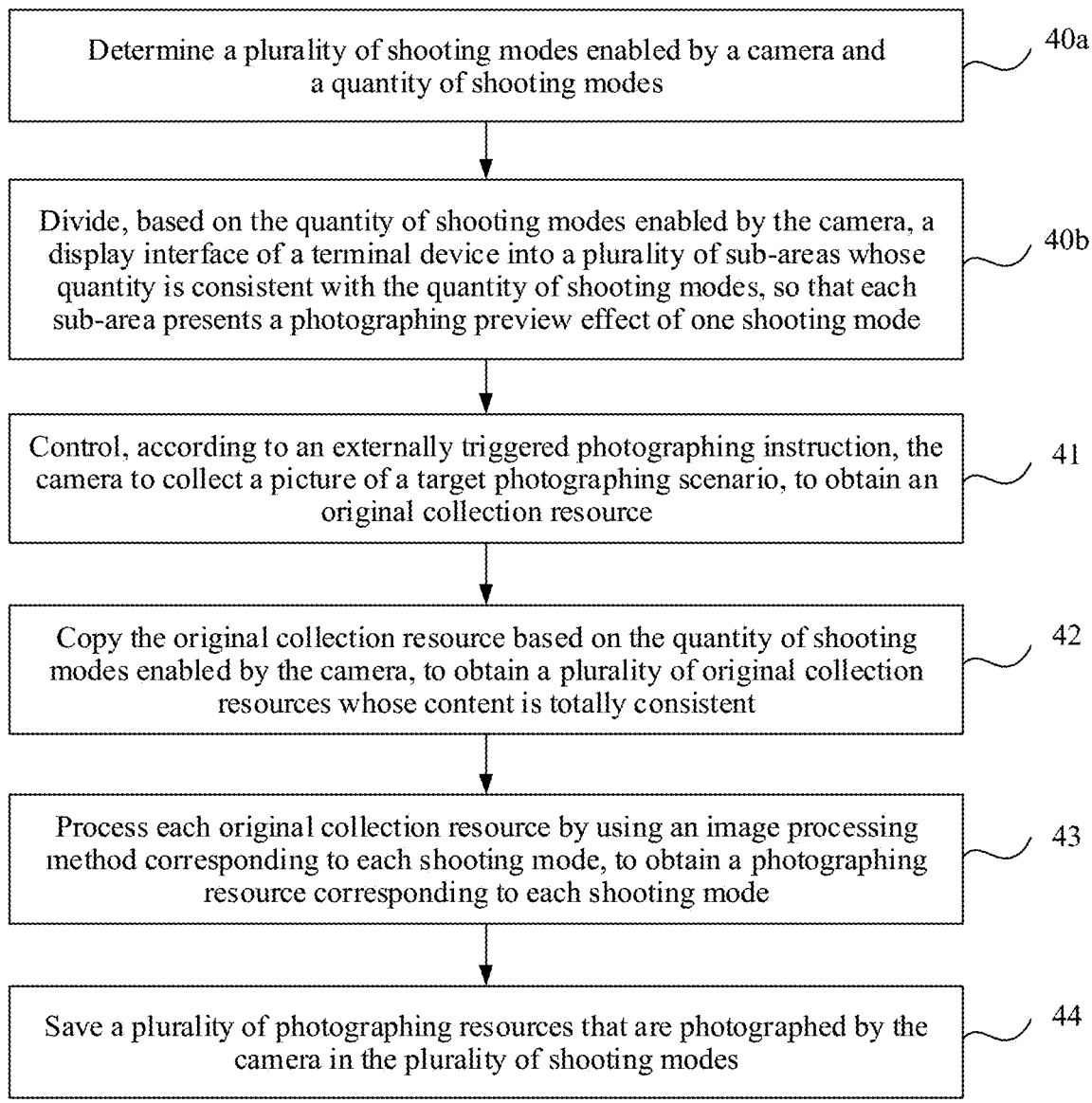
FIG. 4 is a schematic flowchart of Embodiment 2 of a photographing processing method according to this application.

For example, based on the foregoing embodiment, FIG. 4 is a schematic flowchart of Embodiment 2 of a photographing processing method according to this application. As shown in FIG. 4, in this embodiment, step 32 may be implemented by using the following steps:

Step 41: Control, according to the externally triggered photographing instruction, the camera to collect a picture of a target photographing scenario, to obtain an original collection resource.

In this embodiment, when the terminal device displays a pre-photographed image on the display interface, the user may deliver a photographing instruction to the terminal device. In this way, when obtaining the photographing instruction, the terminal device controls the camera to start collecting the picture of the target photographing scenario. Further, the camera lens and the image sensor are used to obtain the light that enters the target photographing scenario in the camera, to obtain the original collection resource.

Step 42: Copy the original collection resource based on a quantity of shooting modes enabled by the camera, to obtain a plurality of original collection resources whose content is totally consistent.

For example, when the camera of the terminal device performs photographing in the plurality of modes, to display pictures captured in the plurality of shooting modes on the display interface, processing may be performed based on the original collection resources captured by the camera. First, a plurality of resources whose quantity is consistent with the quantity of the shooting modes are obtained, and then processing is performed based on an image processing algorithm corresponding to each shooting mode.

For example, in this embodiment, the terminal device first determines the quantity of shooting modes enabled by the camera, and then makes a plurality of copies of the original collection resource, to obtain the plurality of original collection resources whose content is totally consistent. It may be understood that a specific quantity of the plurality of copies is consistent with the quantity of shooting modes enabled by the camera.

Step 43: Process each original collection resource by using an image processing method corresponding to each shooting mode, to obtain a photographing resource corresponding to each shooting mode.

In this embodiment, after obtaining the plurality of original collection resources whose content is totally consistent, the terminal device processes the corresponding original collection resources by using the image processing algorithm corresponding to each shooting mode based on each shooting mode enabled by the camera, to obtain the photographing resource corresponding to each shooting mode.

For example, in a monochrome shooting mode, a monochrome image processing algorithm is used to perform monochrome processing on an original image, and a processed image is displayed in a screen area corresponding to the monochrome shooting mode such that the user views a photographing effect.

In a beautification shooting mode, after it is identified, by using an algorithm, that a photographing scenario includes a portrait, an original image is processed by using a beautification algorithm, and a processed image is displayed in a screen area corresponding to the beautification shooting mode such that the user views a photographing effect.

Correspondingly, after an external photographing instruction is received (for example, the user taps a photographing button, or sends a voice instruction), both photographed images processed in the monochrome shooting mode and the beautification shooting mode are saved.

In a possible design of this embodiment, before step 32, that is, as shown in FIG. 4, before step 41, the method may further include the following steps:

Step 40a: Determine the plurality of shooting modes enabled by the camera and the quantity of shooting modes.

In this embodiment, when the terminal device may perform photographing based on the plurality of shooting modes, to obtain a photographed image corresponding to each shooting mode, the plurality of shooting modes (which are actually specific shooting modes) enabled by the camera and the quantity of shooting modes need to be first determined. In this way, the terminal may divide an area of the display interface based on the quantity of shooting modes such that the display interface of the terminal device can display photographing resources in all the shooting modes.

In an example, step 40a may be implemented in the following manner: determining, based on preset camera information in the terminal device, the plurality of shooting modes enabled by the camera and the quantity of shooting modes.

In this embodiment, before the terminal device is delivered from the factory, camera information may be preset inside the terminal device. In this way, when the terminal device starts the camera function, the plurality of shooting modes enabled by the camera and the quantity of shooting modes may be determined based on the internal preset camera information.

It should be noted that, the preset camera information in the terminal device may be modified based on a requirement of the user. For example, after the user selects a plurality of shooting modes based on an actual requirement and sets the plurality of shooting modes as default selection during camera setting, when the terminal device is restarted subsequently, the terminal device may automatically determine the plurality of shooting modes selected by the user.

For example, when a person is photographed, a wide aperture mode and a portrait mode are simultaneously displayed by default. When the user manually makes a change, for example, the user manually replaces "wide aperture" with "dynamic photo", the terminal device performs photographing based on the dynamic photo mode and the portrait mode.

In another example, step 40a may be further implemented in the following manner: obtaining a mode selection indication of the user; and determining, based on the mode selection indication, the plurality of shooting modes enabled by the camera and the quantity of shooting modes.

In this embodiment, when the camera of the terminal device is enabled, a mode selection prompt may be pushed to the user such as to prompt the user to select a specific shooting mode. The user may select the specific shooting mode based on the mode selection prompt. In this case, the terminal device may obtain the mode selection indication of the user such as to determine the plurality of shooting modes enabled by the camera and the quantity of shooting modes.

For example, in this embodiment, when the shooting modes of the terminal device include a plurality of modes such as the normal camera mode, the painter mode, the monochrome mode, the wide aperture mode, and the dynamic photo mode, the user may select a mode such as the painter mode or the monochrome mode, and the selection operation is the mode selection indication of the user. In this way, the terminal device may obtain the plurality of shooting modes enabled by the camera and the quantity of shooting modes.

Step 40b: Divide, based on the quantity of shooting modes enabled by the camera, the display interface of the terminal device into a plurality of sub-areas whose quantity is consistent with the quantity of shooting modes such that each sub-area presents a photographing preview effect of one shooting mode.

Optionally, in this embodiment, to enable the display interface of the terminal device to simultaneously display photographing resources in the plurality of selected photographing modes, before the terminal device controls the camera to photograph, the terminal device first divides the display interface of the terminal device based on the obtained quantity of shooting modes enabled by the camera to obtain the plurality of sub-areas whose quantity is consistent with the quantity of shooting modes, and each sub-area is used to present a photographing preview effect of one shooting mode. In this way, in a subsequent photographing process, the photographing resources collected by the camera in the plurality of shooting modes may be respectively displayed in the corresponding sub-areas. This achieves an objective that the terminal device simultaneously displays multi-mode photographing resources.

It should be noted that the quantity of shooting modes in this embodiment may be determined based on a size of the display interface of the terminal device. When the display interface of the terminal device is relatively large, a relatively large quantity of shooting modes may be selected at the same time. When the display interface of the terminal device is relatively small, a relatively small quantity of shooting modes may be selected at the same time. For example, for a terminal device with a relatively large display interface, such as a tablet computer, a quantity of selected shooting modes may be 4, 6, 8, or more, and for a terminal device with a relatively small display interface, such as a mobile phone, a quantity of selected shooting modes may be 2, or the like.

It may be understood that a specific quantity of selected shooting modes is not limited in this embodiment of this application, and may be determined based on an actual situation. Details are not described herein again.

Figure 5:
FIG. 5 is a schematic diagram of presenting a photographing resource on a display interface of a terminal device in a normal shooting mode and a painter shooting mode.

For example, FIG. 5 is a schematic diagram of presenting a photographing resource on the display interface of the terminal device in the normal shooting mode and the painter shooting mode. Refer to FIG. 5. This embodiment is described by using an example in which the terminal device is a mobile phone. The terminal device determines that the terminal device has two shooting modes, which are respectively the normal shooting mode and the painter shooting mode. For example, an upper part of the display interface displays a photographing resource obtained by photographing in the normal shooting mode, and a lower part of the display interface displays a photographing resource obtained by photographing in the painter shooting mode. In this way, the user can intuitively understand a shooting mode corresponding to a preview sub-area.

For example, as shown in FIG. 5, brightness of the photographing resource obtained by photographing in the normal shooting mode is greater than brightness of the photographing resource obtained by photographing in the painter shooting mode.

Optionally, refer to FIG. 5. The terminal device may further support the user in switching to another shooting mode. Specifically, switching may be performed by using a "More" option in a lower right corner of the display interface.

Further, the method may further include a process of storing the photographed photographing resources. Therefore, as shown in FIG. 4, after step 43, the method may further include the following step:

Step 44: Save a plurality of photographing resources that are photographed by the camera in the plurality of shooting modes.

In this embodiment, after sending the photographing instruction, the terminal device may photograph an image based on the obtained photographing instruction, and save, in the terminal device, a picture photographed in each shooting mode. That is, the terminal device may simultaneously save photographing resources (photos and videos) in all selected shooting modes. In this way, the user may select, based on an actual requirement, to-be-reserved or to-be-deleted photographing resources, and may simultaneously save photos and videos in all selected modes or scenarios, thereby avoiding repeated photographing.

The photographing processing method provided in this embodiment of this application includes controlling, according to the externally triggered photographing instruction, the camera to collect the picture of the target photographing scenario, to obtain the original collection resource, copying the original collection resource based on the quantity of shooting modes enabled by the camera, to obtain the plurality of original collection resources whose content is totally consistent, and processing each original collection resource by using an image processing method corresponding to each shooting mode, to obtain the photographing resource corresponding to each shooting mode. In this technical solution, the terminal device may simultaneously photograph in the plurality of shooting modes, and simultaneously display photographing resources corresponding to all shooting modes on the display interface such that the user can more directly observe which picture has a better effect without an operation of switching modes back and forth. This avoids a problem that an operation process is complex or an important photographing moment may be missed during mode switching.

Figure 6:
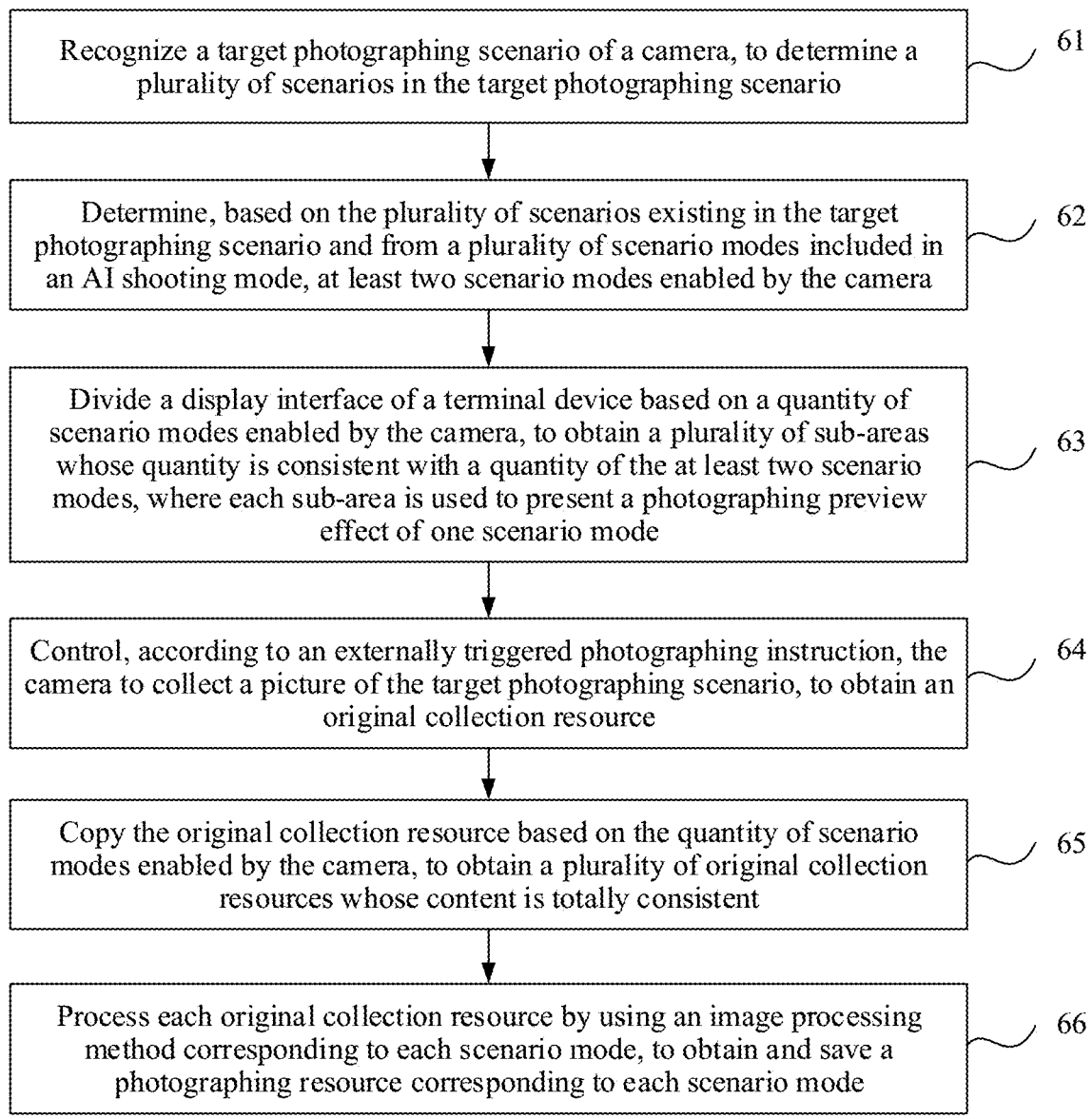
FIG. 6 is a schematic flowchart of Embodiment 3 of a photographing processing method according to this application.

For example, based on the foregoing embodiment shown in FIG. 3, FIG. 6 is a schematic flowchart of Embodiment 3 of a photographing processing method according to this application. As shown in FIG. 6, before step 34, the method may further include the following steps:

Step 61: Recognize the target photographing scenario of the camera, to determine a plurality of scenarios in the target photographing scenario.

In an intelligent photographing scenario in this embodiment, the terminal device may perform AI scenario identification on the target photographing scenario of the camera, to determine the plurality of scenarios in the target photographing scenario. For example, the target photographing scenario includes a sunset scenario and a forest scenario.

A quantity of scenarios and scenario content that exist in the target photographing scenario are not limited in this embodiment, and may be determined based on an actual situation.

Step 62: Determine, based on the plurality of scenarios in the target photographing scenario and from the plurality of scenario modes included in the AI shooting mode, at least two scenario modes enabled by the camera.

In actual application, the AI shooting mode supported by the terminal device may include but is not limited to the following plurality of scenario modes, for example, sunset, greenery, building, and river. Therefore, the terminal device may adaptively match, based on a scenario identified by the AI, a plurality of scenario modes with a best photographing effect, that is, determine, from the plurality of scenario modes included in the AI shooting mode, the at least two scenario modes enabled by the camera.

For example, when the target photographing scenario identified by the terminal device includes the sunset scenario and the forest scenario, the terminal device may select a sunset scenario mode and a forest scenario mode from a plurality of scenario modes supported by the camera, and use the sunset scenario mode and the forest scenario mode as a scenario mode enabled by the camera.

Step 63: Divide the display interface of the terminal device based on a quantity of scenario modes enabled by the camera, to obtain a plurality of sub-areas whose quantity is consistent with a quantity of the at least two scenario modes, where each sub-area is used to present a photographing preview effect of one scenario mode.

In this embodiment, to enable the display interface of the terminal device to simultaneously display photographing resources in the plurality of selected scenario modes, before the terminal device controls the camera to photograph, the terminal device first divides the display interface of the terminal device based on the obtained quantity of scenario modes enabled by the camera, to obtain the plurality of sub-areas whose quantity is consistent with the quantity of scenario modes, and each sub-area is used to present a photographing preview effect of one scenario mode. In this way, in a subsequent photographing process, the photographing resources collected by the camera in the plurality of scenario modes may be respectively displayed in the corresponding sub-areas. This achieves an objective that the terminal device simultaneously displays the photographing resources in the plurality of scenario modes.

It should be noted that the quantity of selected scenario modes in this embodiment may also be determined based on the size of the display interface of the terminal device. When the display interface of the terminal device is relatively large, a relatively large quantity of scenario modes may be enabled at the same time. When the display interface of the terminal device is relatively small, a relatively small quantity of scenario modes may be selected at the same time.

Similarly, for a terminal device with a relatively large display interface, such as a tablet computer or a computer, a quantity of enabled scenario modes may be 4, 6, or more, and for a terminal device with a relatively small display interface, such as a mobile phone, a quantity of enabled scenario modes may be 2, or the like.

It may be understood that a specific quantity of enabled scenario modes is not limited in this embodiment of this application, and may be determined based on an actual situation. Details are not described herein again.

Correspondingly, in this embodiment, as shown in FIG. 6, step 34 may be implemented by using the following step:

Step 64: Control, according to the externally triggered photographing instruction, the camera to collect the picture of the target photographing scenario, to obtain the original collection resource.

An implementation principle of this step is the same as an implementation principle of step 41 in the embodiment shown in FIG. 4. For details, refer to the descriptions in step 41. Details are not described herein again.

Step 65: Copy the original collection resource based on the quantity of scenario modes enabled by the camera, to obtain a plurality of original collection resources whose content is totally consistent.

For example, when the terminal device determines that the camera enables the AI shooting mode, that is, determines the plurality of scenario modes, the terminal device may obtain, based on the original collection resource collected by the camera, the plurality of original collection resources whose content is totally consistent. It may be understood that the plurality of original collection resources whose content is totally consistent may be obtained by copying, and a specific quantity of the plurality of copies is consistent with the quantity of scenario modes enabled by the camera.

Step 66: Process each original collection resource by using an image processing method corresponding to each scenario mode, to obtain and save a photographing resource corresponding to each scenario mode.

Optionally, in this embodiment, after obtaining the plurality of original collection resources whose content is totally consistent, the terminal device may separately perform artificial intelligence analysis and calculation on light scenarios of the original collection resources based on the scenario modes enabled by the camera, output the photographing resource corresponding to each scenario mode, and display the photographing resource on the display interface of the terminal device.

For example, when a photographing scenario includes a blue sky scenario, a greenery scenario, a sunset scenario, a portrait scenario, and the like at the same time, the AI provides several scenario interfaces that can be optimized for the user to select. After the user selects the sunset scenario, the portrait scenario or the like, an optimized image with relatively warm color parameters in the sunset scenario and an optimized image with beautification and wide aperture parameters in the portrait scenario are separately displayed on the screen using an AI algorithm. After a photographing instruction (for example, a tap operation or a voice instruction) of the user is received, both an original image and an image obtained after parameter optimization may be stored on the mobile phone.

Similarly, in this embodiment, after obtaining the photographing resource corresponding to each scenario mode, the terminal device may save the photographing resources corresponding to all scenario modes into the terminal device such that the user subsequently processes the saved photographing resources in the plurality of scenario modes based on an actual requirement, thereby avoiding repeated photographing.

Figure 7:
FIG. 7 is a schematic diagram of presenting a photographing resource on a display interface of a terminal device in a sunset scenario mode and a greenery scenario mode.

For example, FIG. 7 is a schematic diagram of presenting a photographing resource on the display interface of the terminal device in the sunset scenario mode and the greenery scenario mode. Refer to FIG. 7. This embodiment is described by using an example in which the terminal device is a mobile phone. The terminal device determines that the terminal device has two scenario modes, which are respectively the sunset scenario mode and the greenery scenario mode. For example, an upper part of the display interface displays a photographing resource obtained by photographing in the sunset scenario mode, and a lower part of the display interface displays a photographing resource obtained by photographing in the greenery scenario mode. In this way, the user can intuitively understand a scenario mode corresponding to a preview sub-area.

For example, as shown in FIG. 7, for photographing resources obtained by photographing in the sunset scenario mode and the greenery scenario mode, the photographing resource obtained by photographing in the sunset scenario mode may reflect an effect of the sunset acting on the greenery, and the photographing resource obtained by photographing in the greenery scenario mode focuses on the greenery, and does not pay much attention to the effect of the sunset acting on the greenery.

The photographing processing method provided in this embodiment of this application includes recognizing the target photographing scenario of the camera, to determine the plurality of scenarios in the target photographing scenario, determining, based on the plurality of scenarios in the target photographing scenario and from the plurality of scenario modes included in the AI shooting mode, the at least two scenario modes enabled by the camera, dividing the display interface of the terminal device based on the quantity of scenario modes enabled by the camera, to obtain the plurality of sub-areas whose quantity is consistent with the quantity of the at least two scenario modes, controlling, according to the externally triggered photographing instruction, the camera to collect the picture of the target photographing scenario, to obtain the original collection resource, copying the original collection resource based on the quantity of scenario modes enabled by the camera, to obtain the plurality of original collection resources whose content is totally consistent; and processing each original collection resource by using the image processing method corresponding to each scenario mode, to obtain and save the photographing resource corresponding to each scenario mode. In this technical solution, the camera of the terminal device may simultaneously photograph in the plurality of scenario modes, and simultaneously display photographing resources corresponding to all scenario modes on the display interface such that the user can more directly observe which picture has a better effect without an operation of switching modes back and forth. This avoids a problem that an operation process is complex or an important photographing moment may be missed during mode switching.

Figure 8:
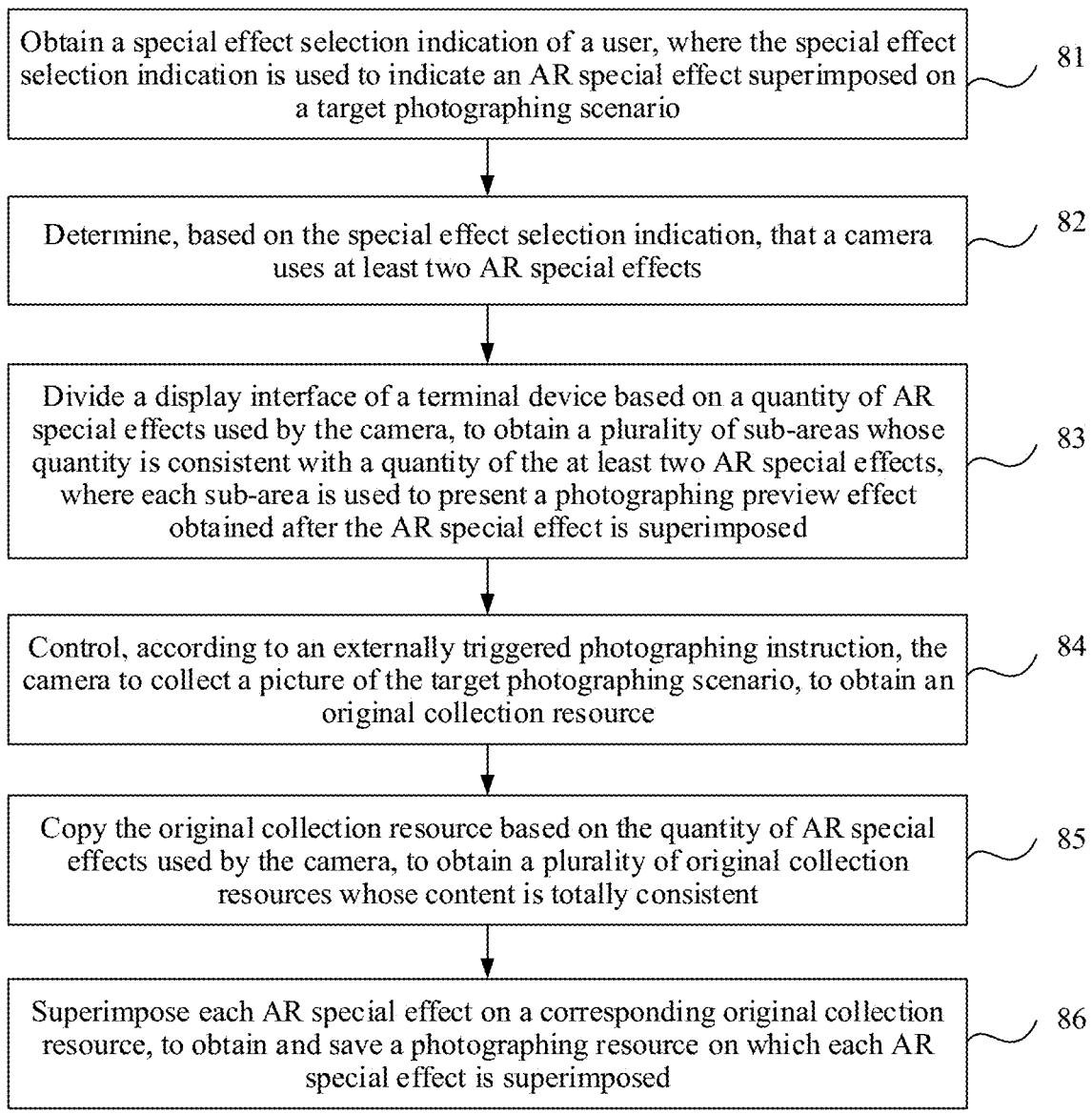
FIG. 8 is a schematic flowchart of Embodiment 4 of a photographing processing method according to this application.

For example, based on the foregoing embodiment shown in FIG. 3, FIG. 8 is a schematic flowchart of Embodiment 4 of a photographing processing method according to this application. As shown in FIG. 8, before step 36, the method may further include the following steps:

Step 81: Obtain a special effect selection indication of the user, where the special effect selection indication is used to indicate an AR special effect superimposed on the target photographing scenario.

In this embodiment of this application, the terminal device may support a plurality of AR special effect resources. The user may select, from the plurality of AR special effect resources, at least two AR special effects that the user wants to superimpose on the target photographing scenario. For example, when an AR special effect that the user can select is displayed on the display interface of the terminal device, the user may tap a target AR special effect to send the special effect selection indication.

It may be understood that a type of the AR special effect resource supported by the terminal device may be determined based on performance of the terminal device, and the AR special effect in the special effect selection indication may be determined based on an actual requirement of the user. This is not limited in this embodiment.

Step 82: Determine, based on the special effect selection indication, that the camera uses at least two AR special effects.

For example, after obtaining the special effect selection indication, the terminal device may determine, based on the special effect selection indication, the AR special effect that needs to be superimposed on the target photographing scenario. Optionally, the special effect selection indication of the user may be used to indicate the camera to use a plurality of AR special effects.

For example, the AR special effect supported by the camera of the terminal device includes: a 3D virtual object, a gesture special effect, fun makeup, a variety of backgrounds, and the like. For example, when the user determines, based on the special effect selection indication, to select the gesture special effect, and the selected gesture special effect is "love in life", there may be two types of gesture special effect: one is a kind of heart called eternal heart, and the other is a kind of love called fingertip love. Therefore, in this embodiment, "a kind of heart called eternal heart" and "a kind of love called fingertip love" supported by the camera of the terminal device may be used as two AR special effects used by the camera.

Step 83: Divide the display interface of the terminal device based on a quantity of AR special effects used by the camera, to obtain a plurality of sub-areas whose quantity is consistent with a quantity of the at least two AR special effects, where each sub-area is used to present a photographing preview effect obtained after the AR special effect is superimposed.

In this embodiment, to enable the display interface of the terminal device to simultaneously display photographing preview effects obtained after the camera uses different special effects, before controlling the camera to photograph, the terminal device first divides the display interface of the terminal device based on the quantity of AR special effects used by the camera, to obtain the plurality of sub-areas whose quantity is consistent with the quantity of AR special effects, and each sub-area is used to present a photographing preview effect obtained after the AR special effect is superimposed. In this way, in a subsequent photographing process, the camera may display, in corresponding sub-areas, a plurality of types of photographing resources separately superimposed with the AR special effects. This achieves an objective that the terminal device simultaneously displays the photographing resources separately superimposed with the AR special effect.

It should be noted that a type of a selected AR special effect in this embodiment may be determined based on the size of the display interface of the terminal device. When the display interface of the terminal device is relatively large, more types of AR special effects may be selected at the same time. When the display interface of the terminal device is relatively small, fewer AR special effects may be selected at the same time. In this embodiment of this application, the type of the selected AR special effect is not limited, and specific content of the selected AR special effect is not limited either. The AR special effect may be determined based on an actual situation. Details are not described herein again.

Correspondingly, in this embodiment, as shown in FIG. 8, step 36 may be implemented using the following step:

Step 84: Control, according to the externally triggered photographing instruction, the camera to collect the picture of the target photographing scenario, to obtain the original collection resource.

An implementation principle of this step is the same as an implementation principle of step 41 in the embodiment shown in FIG. 4. For details, refer to the descriptions in step 41. Details are not described herein again.

Step 85: Copy the original collection resource based on the quantity of AR special effects used by the camera, to obtain a plurality of original collection resources whose content is totally consistent.

For example, when the terminal device determines the AR special effect used by the camera, the terminal device may obtain, based on the original collection resource collected by the camera, the plurality of original collection resources whose content is totally consistent and whose quantity is the same as the quantity of the used AR special effects. For example, the plurality of original collection resources may be obtained by copying the original collection resource.

Step 86: Superimpose each AR special effect on a corresponding original collection resource, to obtain and save a photographing resource on which each AR special effect is superimposed.

Optionally, after the terminal device uses the camera to photograph and obtains the plurality of original collection resources, the selected AR special effects may be respectively superimposed on the corresponding original collection resources such that the photographing resources presented on the display interface of the terminal device are photographing resources on which the AR special effects are respectively superimposed.

Figure 9:
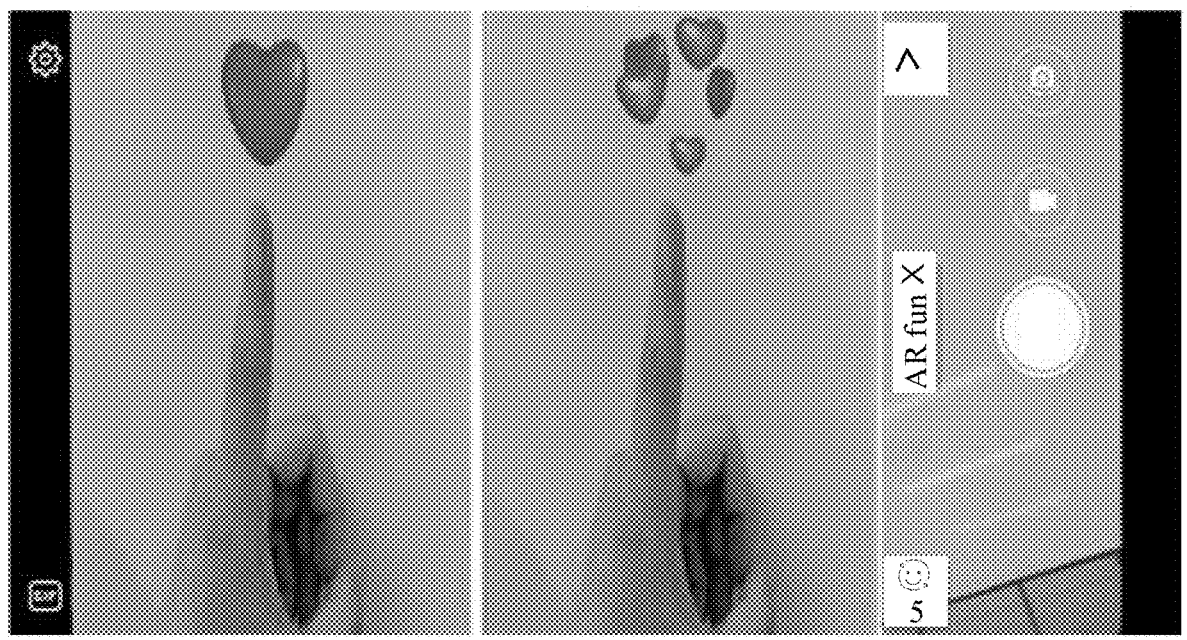
FIG. 9 is a schematic diagram of presenting a photographing resource on a display interface of a terminal device by using two AR special effects.

For example, FIG. 9 is a schematic diagram of presenting a photographing resource on the display interface of the terminal device by using two AR special effects. Refer to FIG. 9. This embodiment is described by using an example in which the terminal device is a mobile phone and there are two types of AR special effects. For example, based on the operations in step 81 to step 86 in this embodiment, a camera application interface of the terminal device may display an "AR fun" function. In this case, the display interface of the terminal device may be divided into a left part and a right part. The left part is used to display a photographing resource superimposed with the special effect of "a kind of heart called eternal heart", and the right part is used to display a photographing resource superimposed with the special effect of "a kind of love called fingertip love". In this way, the user can intuitively understand a photographing effect presented in a preview sub-area.

The photographing processing method provided in this embodiment of this application includes: obtaining the special effect selection indication of the user; determining, based on the special effect selection indication, that the camera uses at least two AR special effects; dividing the display interface of the terminal device based on the quantity of AR special effects used by the camera, to obtain the plurality of sub-areas whose quantity is consistent with the quantity of the at least two AR special effects; controlling, according to the externally triggered photographing instruction, the camera to collect the picture of the target photographing scenario, to obtain the original collection resource; copying the original collection resource based on the quantity of AR special effects used by the camera, to obtain the plurality of original collection resources whose content is totally consistent; and superimposing each AR special effect on the corresponding original collection resource, to obtain and save the photographing resource on which each AR special effect is superimposed. In this technical solution, during photographing, the terminal device may simultaneously photograph pictures or videos with a plurality of AR special effects such that the user can more directly observe which AR special effect has a better effect. This reduces an operation of switching mode scenarios back and forth, and avoids repeated photographing, thereby improving user experience.

Further, the photographing processing method provided in this embodiment of this application may be further used for video recording. Further, when the multi-mode switch of the camera is turned on, the terminal device may record a video in a plurality of shooting modes, and separately present photographing effects on the display interface of the terminal device.

For example, the plurality of shooting modes may include shooting modes such as a normal mode, a delay mode, and a slow-mo mode. Correspondingly, after photographing resources are recorded, videos in all shooting modes may be saved, or videos may be saved according to a user selection.

In this embodiment, an implementation principle of video recording based on a multi-camera mode by the terminal device is similar to the foregoing implementation principle of multi-mode shooting. Details are not described herein again.

Figure 10:
FIG. 10 is a schematic diagram of presenting a video recording resource on a display interface of a terminal device in a multi-camera mode.

For example, FIG. 10 is a schematic diagram of presenting a video recording resource on the display interface of the terminal device in the multi-camera mode. Refer to FIG. 10. For the terminal device such as the mobile phone, the display interface of the terminal device is divided into an upper part and a lower part. The upper part is used to display a video recording resource in the normal shooting mode, and the lower part is used to display a recording video in the slow-mo shooting mode.

It may be understood that a difference between video recording resources presented by using the schematic diagram shown in FIG. 10 is not obvious between the two shooting modes, and is merely an example for description. This embodiment is mainly intended to describe content that the terminal device in this embodiment supports video photographing in the multi-camera mode.

In conclusion, embodiments of this application provide solutions in which a plurality of shooting modes or scenarios can be simultaneously presented and saved when a photo or a video is taken by using a camera function. A terminal device has a multi-mode switch. When a user takes a photo, a plurality of shooting modes may be selected simultaneously when the multi-mode switch of a camera is turned on, and effects in the shooting modes are simultaneously displayed on a display interface of the terminal device. When a photographing instruction of the user is received, photographing of pictures in multi-mode is simultaneously completed. In addition, the terminal device may further support selection of a plurality of scenario modes in an AI mode or a plurality of special effects in an AR mode. In this way, images with a plurality of display effects may be displayed on the display interface of the terminal device based on a user requirement, and a shooting mode does not need to be temporarily switched when photographing is performed, thereby improving user experience. Similarly, the terminal device may further support a multi-mode video recording function such that photographing resources in a plurality of shooting modes can be obtained in one video recording process. This avoids a problem that an important moment may be missed due to switching of shooting modes.

Apparatus embodiments of this application are described below, and may be used to perform method embodiments of this application. For details not disclosed in apparatus embodiments of this application, refer to method embodiments of this application.

Figure 11:
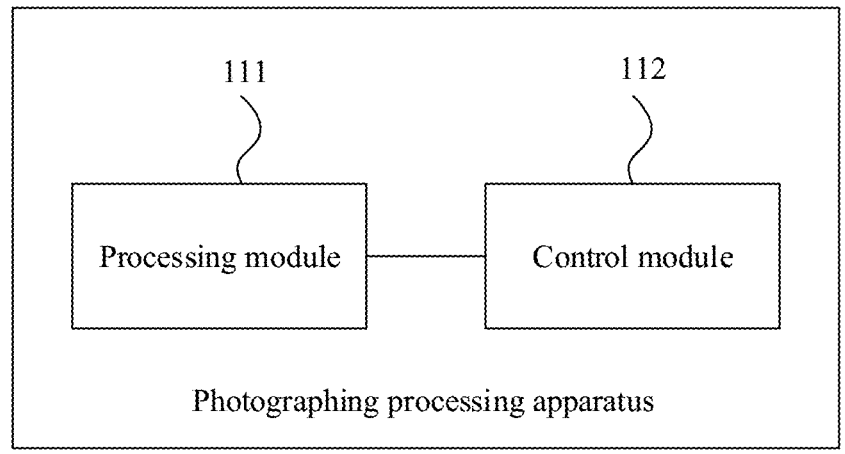
FIG. 11 is a schematic diagram of a structure of an embodiment of a photographing processing apparatus according to this application.

FIG. 11 is a schematic diagram of a structure of an embodiment of a photographing processing apparatus according to this application. The apparatus may be integrated into a terminal device, or may be a terminal device. As shown in FIG. 11, the apparatus in this embodiment may include a processing module 111 and a control module 112.

The processing module 111 is configured to: when a camera of the terminal device is in an enabled state, determine whether a multi-mode switch is turned on for the camera. The multi-mode switch is used to control whether the camera uses a plurality of shooting modes to simultaneously photograph.

The control module 112 is configured to: when the multi-mode switch is turned on for the camera, control, according to an externally triggered photographing instruction, the camera to photograph in the plurality of shooting modes.

In an embodiment of this application, the control module 112 is further configured to: when the multi-mode switch is turned on for the camera, control, according to the externally triggered photographing instruction, the camera to collect a picture of a target photographing scenario, to obtain an original collection resource, copy the original collection resource based on a quantity of shooting modes enabled by the camera, to obtain a plurality of original collection resources whose content is totally consistent, and process each original collection resource by using an image processing apparatus corresponding to each shooting mode, to obtain a photographing resource corresponding to each shooting mode.

In this embodiment of this application, the processing module 111 is further configured to: before the control module 112 controls, according to the externally triggered photographing instruction, the camera to photograph in the plurality of shooting modes, determine the plurality of shooting modes enabled by the camera and the quantity of shooting modes, and divide, based on the quantity of shooting modes enabled by the camera, a display interface of the terminal device into a plurality of sub-areas whose quantity is consistent with the quantity of shooting modes such that each sub-area presents a photographing preview effect of one shooting mode.

In an example, that the processing module 111 is configured to determine the plurality of shooting modes enabled by the camera and the quantity of shooting modes is specifically as follows:

The processing module 111 is further configured to determine, based on preset camera information in the terminal device, the plurality of shooting modes enabled by the camera and the quantity of shooting modes.

In another example, that the processing module 111 is configured to determine the plurality of shooting modes enabled by the camera and the quantity of shooting modes is specifically as follows:

The processing module 111 is specifically configured to obtain a mode selection indication of a user, and determine, based on the mode selection indication, the plurality of shooting modes enabled by the camera and the quantity of shooting modes.

In any one of the foregoing embodiments of this application, the processing module 111 is further configured to save a plurality of photographing resources that are photographed by the camera in the plurality of shooting modes.

In another embodiment of this application, the processing module 111 is further configured to: when the multi-mode switch is not turned on for the camera, determine that the camera enables an artificial intelligence AI shooting mode. The AI shooting mode includes a plurality of scenario modes.

The control module 112 is further configured to control the camera to photograph based on the plurality of scenario modes included in the AI shooting mode.

For example, the processing module 111 is further configured to: before the control module 112 controls the camera to photograph based on the plurality of scenario modes included in the AI shooting mode, recognize the target photographing scenario of the camera, to determine a plurality of scenarios in the target photographing scenario, determine, based on the plurality of scenarios in the target photographing scenario and from the plurality of scenario modes included in the AI shooting mode, at least two scenario modes enabled by the camera, and divide the display interface of the terminal device based on a quantity of scenario modes enabled by the camera, to obtain a plurality of sub-areas whose quantity is consistent with a quantity of the at least two scenario modes, where each sub-area is used to present a photographing preview effect of one scenario mode.

In this embodiment, the control module 112 is further configured to control, according to the externally triggered photographing instruction, the camera to collect the picture of the target photographing scenario, to obtain the original collection resource, copy the original collection resource based on the quantity of scenario modes enabled by the camera, to obtain a plurality of original collection resources whose content is totally consistent, and process each original collection resource by using an image processing apparatus corresponding to each scenario mode, to obtain and save a photographing resource corresponding to each scenario mode.

In still another embodiment of this application, the processing module 111 is further configured to: when the multi-mode switch is not turned on for the camera, determine that the camera enables a AR shooting mode. The AR shooting mode includes a plurality of special effects.

The control module 112 is further configured to control the camera to select different special effects for photographing in the AR shooting mode.

For example, the processing module 111 is further configured to: before the control module 112 controls the camera to select different special effects for photographing in the AR shooting mode, obtain a special effect selection indication of the user, where the special effect selection indication is used to indicate an AR special effect superimposed on the target photographing scenario, determine, based on the special effect selection indication, that the camera uses at least two AR special effects, and divide the display interface of the terminal device based on a quantity of AR special effects used by the camera, to obtain a plurality of sub-areas whose quantity is consistent with a quantity of the at least two AR special effects, where each sub-area is used to present a photographing preview effect obtained after the AR special effect is superimposed.

In this embodiment, the control module 112 is further configured to control, according to the externally triggered photographing instruction, the camera to collect the picture of the target photographing scenario, to obtain the original collection resource, copy the original collection resource based on the quantity of AR special effects used by the camera, to obtain a plurality of original collection resources whose content is totally consistent, and superimpose each AR special effect on a corresponding original collection resource, to obtain and save a photographing resource on which each AR special effect is superimposed.

The apparatus in this embodiment may be configured to execute the implementation solutions in method embodiments shown in FIG. 3 to FIG. 8. Specific implementations and technical effects are similar, and details are not described herein again.

It should be noted that division into the modules of the foregoing apparatus is merely logical function division, and in actual implementation, all or some modules may be integrated into one physical entity, or may be physically separated. In addition, all these modules may be implemented in a form of software invoked by a processing element, or may be implemented in a form of hardware. Alternatively, some modules may be implemented in a form of software invoked by a processing element, and some modules are implemented in a form of hardware. For example, the determining module may be a processing element separately disposed, or may be integrated into a chip of the foregoing apparatus for implementation. In addition, the determining module may alternatively be stored in a memory of the foregoing apparatus in a form of program code, and is invoked by a processing element of the foregoing apparatus to perform a function of the foregoing determining module. An implementation of another module is similar to the implementation of the determining module. In addition, all or some of these modules may be integrated together, or may be implemented independently. The processing element herein may be an integrated circuit and has a signal processing capability. In an implementation process, steps in the foregoing methods or the foregoing modules may be implemented by using a hardware integrated logical circuit in the processing element, or by using instructions in a form of software.

For example, the foregoing modules may be one or more integrated circuits configured to implement the foregoing method, for example, one or more application-specific integrated circuits (ASICs), one or more microprocessors (digital signal processors (DSPs)), one or more field programmable gate arrays (FPGAs), or the like. For another example, when one of the foregoing modules is implemented in a form of invoking program code by a processing element, the processing element may be a general-purpose processor, for example, a central processing unit (CPU) or another processor that can invoke the program code. For another example, these modules may be integrated together and implemented in a form of a system-on-a-chip (SOC).

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, all or some of the procedures or the functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DIGITAL VERSATILE DISC (DVD)), a semiconductor medium (for example, a solid state drive (SSD)), or the like.

Figure 12:
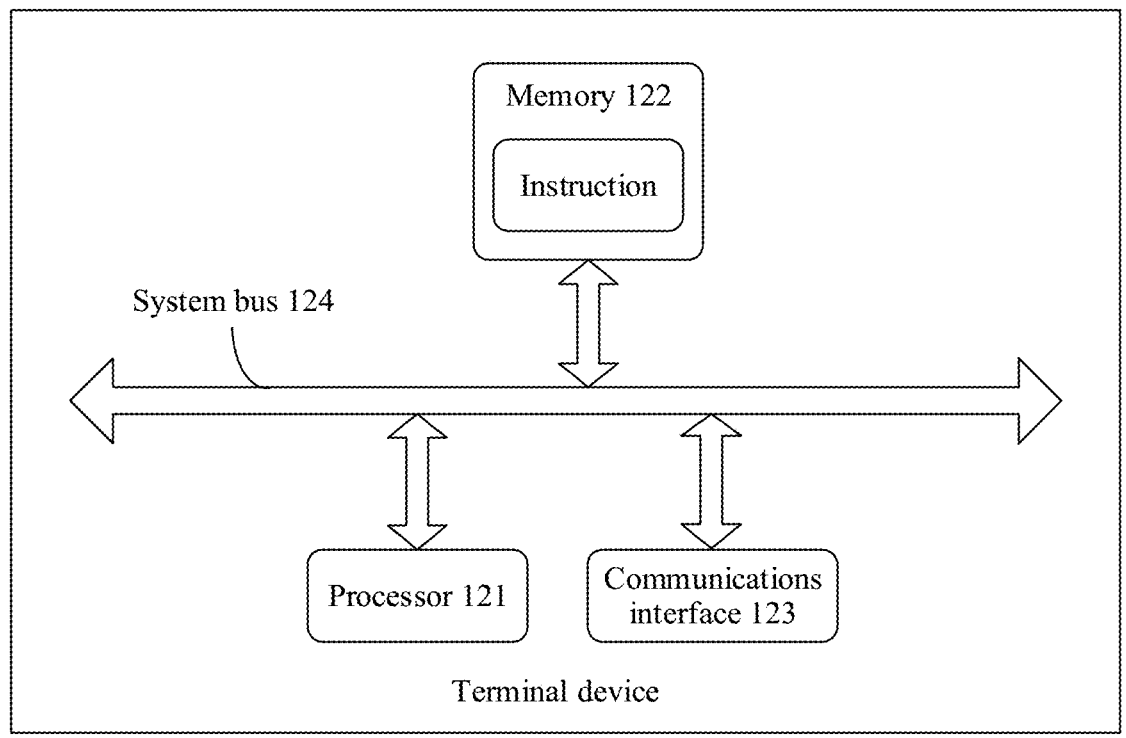
FIG. 12 is a schematic diagram of a structure of an embodiment of a terminal device according to this application.

FIG. 12 is a schematic diagram of a structure of an embodiment of a terminal device according to this application. As shown in FIG. 12, the terminal device may include a processor 121, a memory 122, a communications interface 123, and a system bus 124. The memory 122 and the communications interface 123 are connected to the processor 121 and communicate with each other through the system bus 124. The memory 122 is configured to store computer-executable instructions. The communications interface 123 is configured to communicate with another device. When executing the computer-executable instructions, the processor 121 implements the solutions in the method embodiments shown in FIG. 3 to FIG. 8.

The system bus mentioned in FIG. 12 may be a peripheral component interconnect (PCI) bus, an extended industry standard architecture (EISA) bus, or the like. The system bus may be classified into an address bus, a data bus, a control bus, and the like. For ease of representation, only one thick line is used to represent the bus in the figure, but this does not mean that there is only one bus or only one type of bus. A communications interface is configured to implement communication between a database access apparatus and another device (for example, a client, a read/write library, or a read-only library). The memory may include a random access memory (RAM), or may further include a non-volatile memory, for example, at least one disk memory.

The processor may be a general-purpose processor, including a central processing unit (CPU), a network processor (NP), and the like. The processor may alternatively be a DSP, an ASIC, an FPGA or another programmable logic device, a discrete gate or a transistor logic device, or a discrete hardware component.

Further, an embodiment of this application further provides a computer-readable storage medium. The computer-readable storage medium stores instructions, and when the instructions are run on a computer, the computer is enabled to perform the solutions in the method embodiments shown in FIG. 3 to FIG. 8.

For example, an embodiment of this application further provides a chip for running instructions. The chip is configured to perform the solutions in the method embodiments shown in FIG. 3 to FIG. 8.

An embodiment of this application further provides a program product. The program product includes a computer program. The computer program is stored in a storage medium. At least one processor may read the computer program from the storage medium. When executing the computer program, the at least one processor can implement the solutions in the method embodiments shown in FIG. 3 to FIG. 8.

In this application, "at least one" means one or more, and "a plurality of" means two or more. The term "and/or" describes an association relationship between associated objects and represents that three relationships may exist. For example, A and/or B may represent the following cases: Only A exists, both A and B exist, and only B exists. A and B may be singular or plural. The character "l" generally represents an "or" relationship between the associated objects, and the character "l" in a formula represents a "division" relationship between the associated objects. "At least one of the following items (pieces)" or a similar expression thereof means any combination of these items, including any combination of singular items (pieces) or plural items (pieces). For example, at least one item (piece) of a, b, or c may represent a, b, c, a and b, a and c, b and c, or a, b, and c, where a, b, and c may be singular or plural.

It may be understood that various numbers in embodiments of this application are merely used for ease of distinguishing, and are not used to limit the scope of embodiments of this application.

It should be understood that sequence numbers of the foregoing processes do not mean execution sequences in embodiments of this application. The execution sequences of the processes should be determined based on functions and internal logic of the processes, and should not be construed as any limitation on the implementation processes of embodiments of this application.

What is claimed is:
1. A method comprising:
making a first determination whether a multi-mode switch is turned on for a camera of a terminal device when the camera is in an enabled state, wherein the multi-mode switch enables the camera to simultaneously photograph in a plurality of shooting modes;
controlling, in response to the first determination and according to an externally triggered photographing instruction, the camera to photograph in the shooting modes;
making a second determination that the camera enables an artificial intelligence (AI) shooting mode when the multi-mode switch is not turned on for the camera, wherein the AI shooting mode comprises a plurality of scenario modes; and
controlling, in response to the second determination, the camera to photograph based on the scenario modes.
2. The method of claim 1, wherein controlling, in response to the first determination, the camera comprises:
controlling the camera to collect a picture of a target photographing scenario to obtain an original collection resource;
copying the original collection resource based on a quantity of the shooting modes to obtain a plurality of original collection resources; and processing each original collection resource corresponding to each shooting mode to obtain a photographing resource corresponding to each shooting mode.

3. The method of claim 1, wherein before controlling, in response to the first determination, the camera, the method further comprises:
   determining the shooting modes and a first quantity of the shooting modes; and
   dividing, based on the first quantity, a display interface of the terminal device into a plurality of sub-areas, wherein a second quantity of the sub-areas is consistent with the first quantity such that each sub-area presents a photographing preview effect of one shooting mode.

4. The method of claim 3, further comprising determining, based on preset camera information in the terminal device, the shooting modes and the first quantity.

5. The method of claim 3, further comprising:
   obtaining a mode selection indication of a user; and
   determining, based on the mode selection indication, the shooting modes and the first quantity.

6. The method of claim 1, further comprising saving a plurality of photographing resources that are photographed by the camera in the shooting modes.

7. The method of claim 1, wherein before controlling, in response to the second determination, the camera, the method further comprises:
   recognizing a target photographing scenario of the camera to determine a plurality of scenarios in the target photographing scenario;
   determining, based on the scenarios and the scenario modes, at least two scenario modes enabled by the camera; and
   dividing a display interface of the terminal device based on a third quantity of the at least two scenario modes to obtain a plurality of sub-areas, wherein a fourth quantity of the sub-areas is consistent with the third quantity, and wherein each sub-area presents a photographing preview effect of one scenario mode.

8. The method of claim 1, wherein controlling, in response to the second determination, the camera comprises:
   controlling the camera to collect a picture of a target photographing scenario to obtain an original collection resource;
   copying the original collection resource based on a fifth quantity of scenario modes to obtain a plurality of original collection resources; and
   processing each original collection resource corresponding to each scenario mode to obtain and save a photographing resource corresponding to each scenario mode.

9. The method of claim 1, further comprising:
   determining that the camera enables an augmented reality (AR) shooting mode when the multi-mode switch is not turned on for the camera, wherein the AR shooting mode comprises a plurality of AR special effects; and
   controlling the camera to select different AR special effects for photographing in the AR shooting mode.

10. The method of claim 9, wherein before controlling the camera, the method further comprises:
    obtaining a special effect selection indication of a user, wherein the special effect selection indication indicates an AR special effect superimposed on a target photographing scenario of the camera;
    determining, based on the special effect selection indication, that the camera uses at least two AR special effects; and
    dividing a display interface of the terminal device based on a sixth quantity of the at least two AR special effects to obtain a plurality of sub-areas, wherein a seventh quantity of the sub-areas is consistent with the sixth quantity, and wherein each sub-area presents a photographing preview effect obtained after the AR special effect is superimposed.

11. The method of claim 9, wherein controlling the camera comprises:
    controlling the camera to collect a picture of a target photographing scenario to obtain an original collection resource;
    copying the original collection resource based on a quantity of the AR special effects to obtain a plurality of original collection resources; and
    superimposing each AR special effect on a corresponding original collection resource to obtain and save a photographing resource on which each AR special effect is superimposed.

12. A terminal device comprising:
    a camera; and
    a processor coupled to the camera and configured to:
       make a first determination whether a multi-mode switch is turned on for the camera when the camera is in an enabled state, wherein the multi-mode switch enables the camera to simultaneously photograph in a plurality of shooting modes;
       control, in response to the first determination and according to an externally triggered photographing instruction, the camera to photograph in the shooting modes;
       make a second determination that the camera enables an artificial intelligence (AI) shooting mode when the multi-mode switch is not turned on for the camera, wherein the AI shooting mode comprises a plurality of scenario modes; and
       control, in response to the second determination, the camera to photograph based on the scenario modes.

13. The terminal device of claim 12, wherein the processor is further configured to:
    control, in response to the first determination, the camera to collect a picture of a target photographing scenario to obtain an original collection resource;
    copy the original collection resource based on a quantity of the shooting modes to obtain a plurality of original collection resources; and
    process each original collection resource corresponding to each shooting mode to obtain a photographing resource corresponding to each shooting mode.

14. The terminal device of claim 12, wherein the processor is further configured to:
    determine the shooting modes and a first quantity of shooting modes; and
    divide, based on the first quantity, a display interface of the terminal device into a plurality of sub-areas, wherein a second quantity of sub-areas is consistent with the first quantity such that each sub-area presents a photographing preview effect of one shooting mode.

15. The terminal device according to of claim 14, wherein the processor is further configured to determine, based on preset camera information in the terminal device, the shooting modes and the first quantity.

16. The terminal device according to of claim 14, wherein the processor is further configured to:
    obtain a mode selection indication of a user; and
    determine, based on the mode selection indication, the shooting modes and the first quantity.

17. The terminal device of claim 12, wherein the processor is further configured to save a plurality of photographing resources that are photographed by the camera in the shooting modes.

18. A computer program product comprising a non-transitory computer-readable storage medium storing computer-executable instructions that, when executed by a processor, cause a terminal device to:
   make a first determination whether a multi-mode switch is turned on for a camera of the terminal device when the camera is in an enabled state, wherein the multi-mode switch enables the camera to simultaneously photograph in a plurality of shooting modes;
   control, in response to the first determination and according to an externally triggered photographing instruction, the camera to photograph in the shooting modes
   make a second determination that the camera enables an artificial intelligence (AI) shooting mode when the multi-mode switch is not turned on for the camera, wherein the AI shooting mode comprises a plurality of scenario modes; and
   control, in response to the second determination, the camera to photograph based on the scenario modes.

19. The computer program product of claim 18, wherein the computer-executable instructions that, when executed by the processor, further cause the terminal device to determine, based on preset camera information in the terminal device, the shooting modes.

20. The computer program product of claim 18, wherein the computer-executable instructions that, when executed by the processor, further cause the terminal device to:
   obtain a mode selection indication of a user; and
   determine, based on the mode selection indication, the shooting modes.

* * * * *

UNITED STATES PATENT AND TRADEMARK OFFICE
CERTIFICATE OF CORRECTION

PATENT NO. : 11,895,399 B2
APPLICATION NO. : 17/704656
DATED : February 6, 2024
INVENTOR(S) : Chao Fan It is certified that error appears in the above-identified patent and that said Letters Patent is hereby corrected as shown below:

In the Claims

Claim 15, Column 32, Line 59: "The terminal device according to of claim 14, wherein" should read "The terminal device of claim 14, wherein"

Claim 16, Column 32, Line 63: "The terminal device according to of claim 14, wherein" should read "The terminal device of claim 14, wherein"

Signed and Sealed this
Second Day of April, 2024

Katherine Kelly Vidal
*Director of the United States Patent and Trademark Office*